United States Patent
Mandal et al.

(10) Patent No.: US 7,158,973 B2
(45) Date of Patent: Jan. 2, 2007

(54) METHOD AND APPARATUS FOR CENTRALIZED MANAGEMENT OF A STORAGE VIRTUALIZATION ENGINE AND DATA SERVICES

(75) Inventors: Chhandomay Mandal, Nashua, NH (US); Andrei A. Dancus, Nashua, NH (US); Juan C. Zuluaga, Medford, MA (US); Peter Gill, Nashua, NH (US); Rowan E. DaSilva, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 410 days.

(21) Appl. No.: 10/317,903

(22) Filed: Dec. 12, 2002

(65) Prior Publication Data

US 2004/0117369 A1    Jun. 17, 2004

(51) Int. Cl.
*G06F 17/30* (2006.01)
(52) U.S. Cl. ......................... 707/10; 711/147
(58) Field of Classification Search .................. 707/10; 710/1, 2

See application file for complete search history.

(56) References Cited

U.S. PATENT DOCUMENTS

| | | | |
|---|---|---|---|
| 7,062,624 B1* | 6/2006 | Kano | 711/165 |
| 2002/0103943 A1* | 8/2002 | Lo et al. | 710/2 |
| 2003/0033398 A1* | 2/2003 | Carlson et al. | 709/223 |
| 2003/0055972 A1* | 3/2003 | Fuller et al. | 709/226 |
| 2003/0229645 A1* | 12/2003 | Mogi et al. | 707/102 |
| 2003/0233494 A1* | 12/2003 | Ghosh et al. | 710/1 |

* cited by examiner

*Primary Examiner*—Uyen Le
(74) *Attorney, Agent, or Firm*—Dorsey & Whitney LLP

(57) ABSTRACT

SVE management software uses management software running at a central service processor to control storage virtualization engines operating in a plurality application programming interface (API) that allows a consistent control of all SVE facilities by means of a set of API commands. The management software controls a dispatch module that translates the commands into appropriate instructions for the SVE nodes and communicates with the remote SVE nodes by a plurality of node client-node server pairs that transfer instructions from the dispatch module to the remote nodes and transfer requested information back from the remote nodes to the dispatch module. Various interfaces, such as a command line interpreter and a CIM provider can be built using the API commands.

37 Claims, 24 Drawing Sheets

METHOD AND APPARATUS FOR CENTRALIZED MANAGEMENT OF A STORAGE VIRTUALIZATION ENGINE AND DATA SERVICES

FIELD OF THE INVENTION

This invention relates to data storage systems and, in particular, to the management of large, complex networked storage systems and data services provided for such storage systems from a centralized location via "storage virtualization."

BACKGROUND OF THE INVENTION

Corporations require an ever-increasing amount of data storage capacity in order to streamline operations by using highly centralized Intranet and Internet architectures. A typical large-scale storage system includes many diverse storage resources, including storage subsystems and storage networks. Further, it is common in many contemporary computer systems to provide administrative personnel with data services that allow data storage to be controlled and backup copies of stored data to be made where necessary. These data services can include data volume management in which one or more logical "volumes" are created from stored data so that the data in each volume can be manipulated as a unit. Capacity management must also be provided. Consequently, the costs of deploying and managing storage often increase faster than the actual cost of the storage.

In order to allow administrative personnel to manage the diverse resources a technique called "storage virtualization" is used. Storage virtualization allows all of the storage capacity physically spread throughout the enterprise to be treated as a single logical pool of storage. Virtual access to this storage pool is made available by software that masks all of the details of the individual storage devices, their locations, and the manner of accessing them. Thus, although the end user sees a simple interface and all storage looks like a single pool of local disk storage, the data may actually reside on different devices in different places. It may even be moved without user knowledge. Storage virtualization can also be used to control the required data services from a centralized location.

Storage virtualization is commonly provided by a storage virtualization engine (SVE) that masks the details of the individual storage devices and their actual locations by mapping logical storage addresses to physical storage addresses. The virtualization engine follows predefined rules concerning availability and performance levels and decides where a given piece of data will be stored. Depending on the implementation, a storage virtualization engine can be implemented by specialized hardware located between the host servers and the storage or it can be provided by logical volume managers that map physical storage associated with device logical units (LUNs) into logical disk groups and logical volumes. The host server applications or file systems can then mount the logical volume with no regard to the physical storage location or vendor type.

However, since there may be many logical volume managers and additional backup and control facilities, there still remains a requirement for centralized management software that can manage all of the diverse facilities controlled by a storage virtualization engine from a single location.

SUMMARY OF THE INVENTION

In accordance with the principles of the invention, an SVE control system uses management software at a central service processor to control data services and a storage virtualization engine consisting of volume managers operating in a plurality of remote SVE nodes. Although each volume manager manages storage in the SVE node where it is located and maintains a view of the system from that standpoint, the management software coordinates all volume managers in order to ensure that the managers maintain consistent internal views of the physical storage. In this manner, although the physical storage is located at a plurality of nodes, it appears as a virtual storage pool.

In particular, in one embodiment, the management software provides an application programming interface (API) that allows a consistent control of all SVE facilities by means of a set of API commands. The management software further translates the commands into appropriate instructions for the SVE nodes and maintains synchronization of information in the memory of each SVE node with persistently stored information in system configuration databases. Additionally, the management software aggregates this information and provides access to it through API methods.

In another embodiment, a dispatch module communicates with each remote SVE node by a node client-node server pair that transfers instructions from the dispatch module to that remote node and transfers state information back from that remote node to the dispatch module. In turn, each client is comprised of a further plurality of service clients and each server is comprised of a further plurality of corresponding service servers.

Each service client and service server pair controls a specific data service or a volume manager at the remote node to provide storage control and data services at the node. The dispatch module, in response to a command coordinates the communication of the instructions to each SVE-node in order to ensure that the nodes maintain consistent internal views of the physical storage so that the volume managers, taken together, act as a storage virtualization engine.

In still another embodiment, each of the service client and service server pairs uses a separate communication object to communicate information between the dispatch module and the remote nodes.

In yet another embodiment, information concerning the state of the SVE nodes is returned to, and cached at, the service processor in order to increase processing speed at the service processor.

In a further embodiment, the API provided by the management software can be used to construct a command line interpreter at the service processor.

In another embodiment, the API provided by the management software can be used to construct a CIM provider at the service processor that provides the SVE management services.

BRIEF DESCRIPTION OF THE DRAWINGS

The above and further advantages of the invention may be better understood by referring to the following description in conjunction with the accompanying drawings in which:

FIG. 10 also shows the SveConfig interface that is used to configure the system.

DETAILED DESCRIPTION

Figure 1:
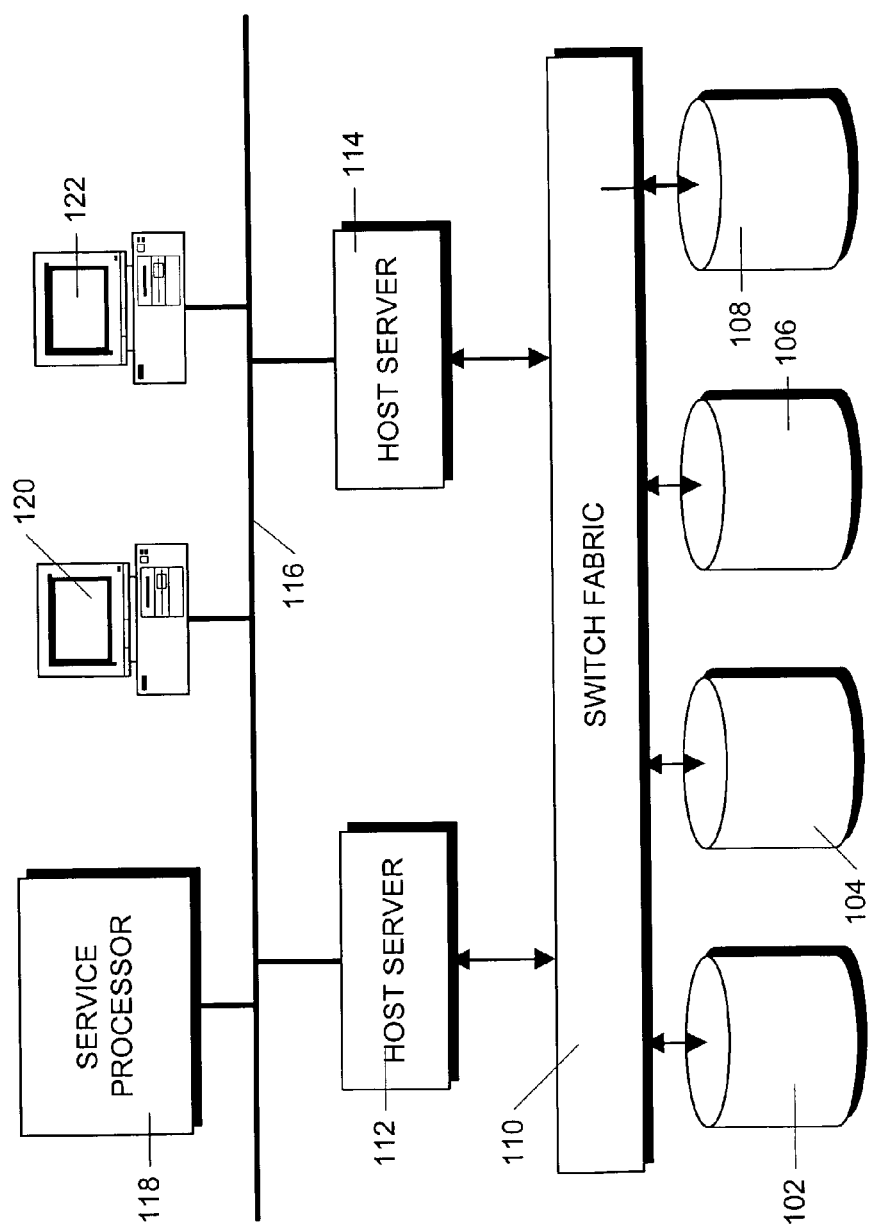
FIG. 1 is a block schematic diagram of a conventional SAN storage system on which the present invention can run.

One common distributed storage system is called a storage area network (SAN) that uses an array of disks connected by a Fibre optic switch fabric to storage servers. The storage servers are connected to a network that delivers the storage services to the high performance computer systems. A typical SAN system is shown in FIG. 1. In this system, an array of Fibre optic disks, represented schematically by disks 102–108 is connected, via Fibre optic switch fabric 110 to host servers 112 and 114. Although only two servers are shown for clarity, one or more servers can be used in such a system. Servers 112 and 114 are, in turn, connected by a conventional network 116 to one or more SAN clients, of which client 122 is illustrated in FIG. 1.

It is common in many computer systems to provide administrative personnel with data services that allow data storage to be controlled and backup copies of stored data to be made where necessary. These data services can include data volume management in which one or more logical "volumes" are created from stored data so that the data in each volume can be manipulated as a unit. The volumes are managed by software called a logical volume manager. An illustrative volume manager called a "Solaris™ Volume Manager (SVM)" is available from Sun Microsystems, Inc. and is described in a manual entitled "Veritas Volume Manager 3.5™" available from http://www.sun.com/products-n-solutions/hardware/docs. This manual is incorporated in its entirety herein by reference.

Data backup services may also include data imaging in which a data copy often called a data "snapshot" or "image" can be made of stored data at a designated point in time. This service provides a system administrator with the ability to make and to maintain the aforementioned replicated data storage systems. A typical data imaging service implements a "point-in-time" volume copy between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging service then allows data updates to be sent from the master volume to the shadow volume as well as updates to be sent from the shadow volume to the master volume when desired. One such data imaging service is called "Instant Imaging (II)" and is available from Sun Microsystems, Inc. 4120 Network Circle, Santa Clara, Calif. 94054. This service is described in detail in a paper entitled "Sun StorEdge™ Instant Image Software Architecture Guide" available at http://www.sun.com/storage/wp.html, which article is hereby incorporated in its entirety by reference.

Such a data service is often provided by using "target emulation software" This software supports alternate paths to the same logical drive, provides a variable logical disk partition size and allows multiple LUNs to be configured on a single Fibre Channel port. The software further permits multiple initiators to access the same partition on separate Fibre Channel loops. Illustrative target emulation software is available from Sun Microsystems, Inc. under the name Storedge™ SCSI Target Emulation (STE) software. This software is described in detail in a manual entitled "Sun StorEdge™ SCSI Target Emulation (STE) 1.1 Release Notes" available at http://www.sun.com/products-n-solutions/hardware/docs. This manual is incorporated in its entirety by reference. The STE software can be used with aforementioned Instant Image software to enables open systems hosts to access an Instant Image volume group ("point-in-time copy") on a Fibre Channel disk array that is connected to a Solaris server.

These services are provided and managed by means of a storage virtualization engine as discussed above running under control of the SVE management software that is discussed in detail below. For example, an SVE control process can run in a dedicated service processor 118 that is connected to network 116. Alternatively, the SVE control process can run in one of the other servers connected to the network. Each of servers 112 and 114 can run SVE software and corresponds to an SVE node. Each SVE node runs the appropriate node management software as discussed below. This SVE management software can be accessed and controlled by administrative personnel via one or more administrative terminals, of which terminal 120 is shown using either a CLI or a CIM interface as discussed below.

Figure 2:
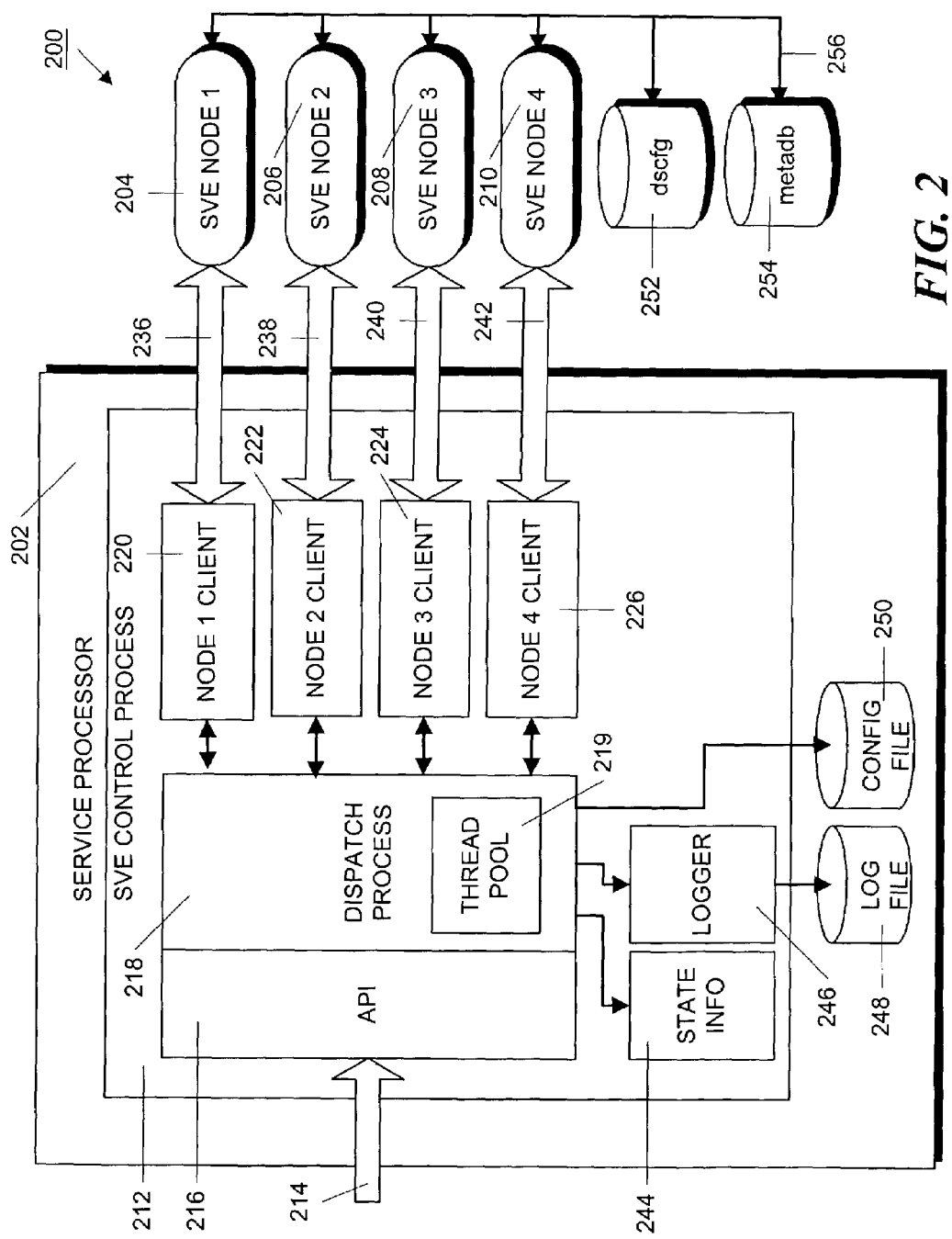
FIG. 2 is a block schematic diagram of an SVE control process running in a service processor and controlled by an SVE API and the mechanism by which the SVE control process communicates with four SVE nodes.

FIG. 2 shows an overall view of the storage virtualization engine management software 200. The goal of management software 200 is to provide an application programming interface (API) that allow clients to manage SVEs in different environments as indicated schematically by arrow 214. The SVE management software consists of two distinct sections: management software, consisting of an SVE control process 212 for a client side that runs, for example, in the service processor 202 and management software for a server side that runs in the SVE nodes 204–210. Although, in the discussion below, the client side management software is described as running on a service processor 202 (a machine where SVE API clients, such as SVE command line interfaces and SVE CIM providers run), it is designed to run on any host, including one of the SVE nodes 204–210. The client-side management software runs in user mode, but it needs super user access to the individual SVE nodes 204–210 to execute local operations in the nodes.

The server side software, running on each SVE node 204–210, provides remote accessibility for controlling SVM (Solaris Volume Manager) software, STE (SCSI Target Emulation) software and II (Instant Image) software running on the individual Q SVE nodes 204–210 and as discussed below.

The SVE control process 212 is comprised of several major elements. The dispatch module 218 is the main element that supports API interface 216. The dispatch module 218, in turn, works in conjunction with other modules, including the node clients 220–226, state information module 244 and the logger 246. In particular, module 218 decides which operations will be executed in SVE nodes 204–210, which clients 220–226 to use, what state information 244 must be updated and performs other operations as discussed below. Module 218 has an available pool of threads 219 to execute various operations in the SVE nodes 204–210 and operates under configuration parameters stored in a persistent configuration file 250.

The state information module 244 is a passive component that caches a small derived information set that is relevant to control of the SVM, STE and II data services. This information is derived from data persisted in data services persistence storage (dscfg) 252 and SVM persistence storage (metadb) 254 that is stored by the SVE nodes 204–210 via network 256. The information used by the dispatch module 218 is cached in state information module 244 in order to make processing faster at the service processor 202. The information is updated by the dispatch module 218 when state changes occur due to a successful API execution. Event listener components in the node clients 220–226 and discussed below, inform the dispatch module 218 upon notification of SVE node state changes due to failover and failback. The dispatch module 218 then updates the cached state information in the state Info component 244. This information is cached in a format suitable for use by the dispatch module 218. Some examples of the data cached (not necessarily in the format shown) are shown in Tables 1 and 2. In particular, Table 1 represents sample cached information for target ports

TABLE 1

| Port | Port Status | Metaset | MetaDevice | Soft Partition | Size | Available |
|------|-------------|---------|------------|----------------|------|-----------|
| tm0 | enabled | msA | md1 | sp1 | 10 G | 70 G |
| | | | | sp2 | 10 G | |
| | | | | sp3 | 10 G | |
| | | | md2 | sp4 | 20 G | 60 G |
| | | | | sp5 | 20 G | |
| tm1 | enabled | msB | md3 | sp6 | 50 G | 150 G |
| | | msC | md4 | sp7 | 40 G | 60 G |
| tm2 | disabled | msD | md5 | sp8 | 10 G | 180 G |
| | | | | sp9 | 10 G | |
| | | | md6 | sp10 | 100 G | 0 G |
| tm3 | enabled | msE | md7 | sp11 | 50 G | 50 G |
| | | | | sp12 | 100 G | |
| | | msF | md8 | | | 200 G |

Table 2 shows sample cached data for STE-exported volumes

TABLE 2

| LUN Name | Vol Name | Primary Port | Alternate Port | SCSI_ID | Options | WWN Masking List |
|----------|----------|--------------|----------------|---------|---------|------------------|
| LUN0 | sp3 | tm0 | tm2 | 0 | qd = 8 | host A |
| LUN1 | sp7 | tm2 | tm0 | 0 | qd = 8 | host B |
| LUN2 | sp12 | tm3 | tm1 | 0 | qd = 8 | host C |

The logger component 246 logs all the SVE APIs executed, the exit status and error messages, if any, of each executed SVE API, as well as important events such as configuration (state) changes due to failover. The messages are logged in /var/adm/messages and are of three types—information messages, warnings, and errors. The management software depends on the logging capabilities of the SVM, STE and II data services on the individual SVE nodes 204–210. The logged messages are stored in a persistent log file 248.

The dispatch module 218, in turn, interacts with a plurality of node clients 220–226 as indicated schematically by arrows 228–234. Each of node clients 220–226 communicates with a single one of SVE nodes 204–210 as indicated schematically by arrows 236–242. Communication between each node client and its corresponding node is performed by a collection of helper classes that are described below. Actual communication is achieved through use of conventional Java Remote Method Invocation (RMI).

The SVE control process 212 that runs in the service processor 202 consists of two main packages: the API package that includes the actual API methods and a control package that implements the APIs. The software of the control package maintains the synchronization of information in the kernel memory of each SVE node 204–210 with the persistently stored information in the dscfg and metadb databases, 252 and 254 as well as with the state information stored in the service processor state information module 244. Additionally, the control package aggregates this information and provides access to it through API methods.

Figure 3:
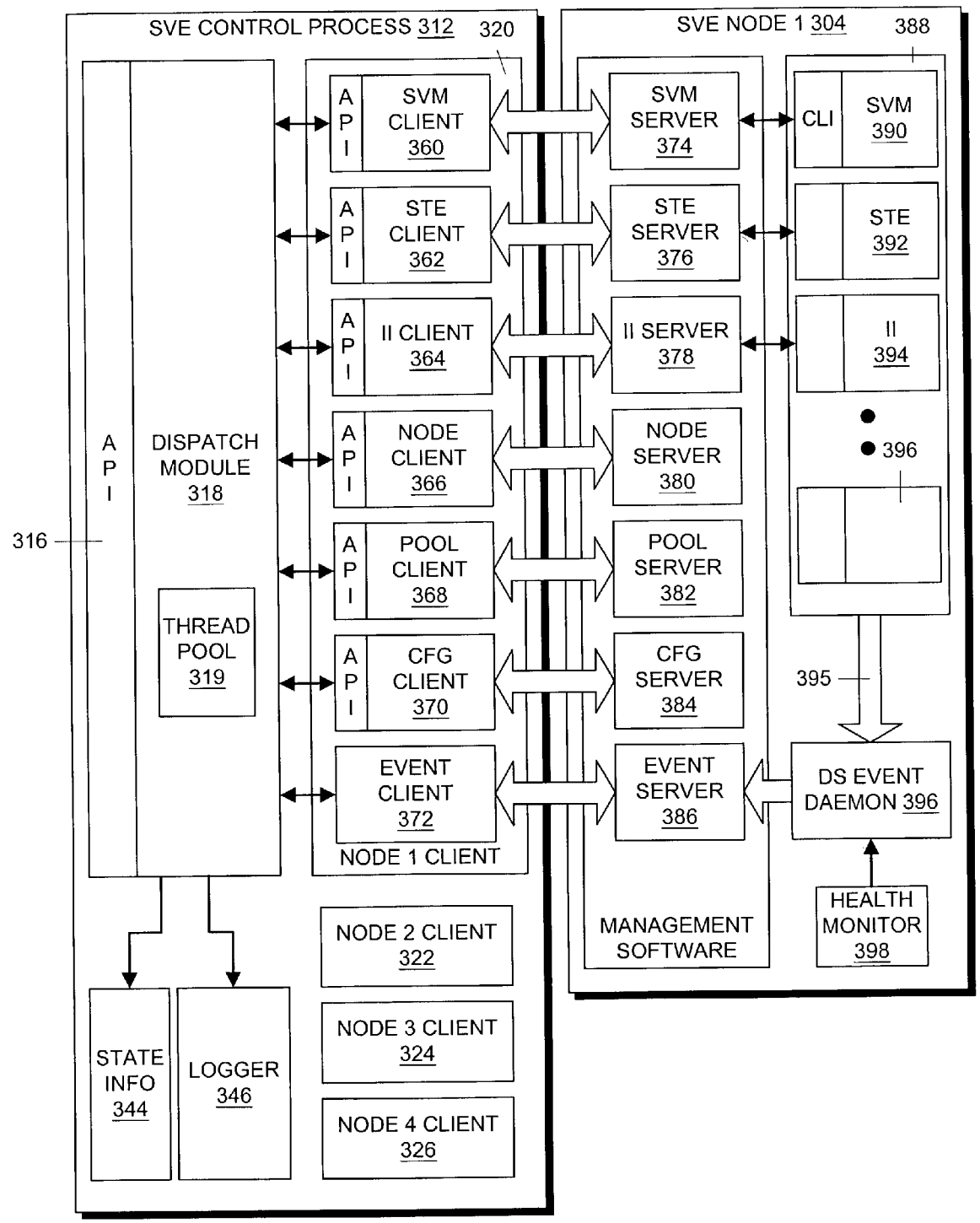
FIG. 3 is an expanded block schematic diagram showing in more detail the internal construction of an SVE node client in the SVE control process and the internal construction of an SVE node.

FIG. 3 is a more detailed block schematic diagram of a node client 320 and a corresponding SVE node 304. Elements in FIG. 3 that correspond to elements in FIG. 2 have been given corresponding numeral designations. For example, dispatch module 218 in FIG. 2 corresponds to dispatch module 318 in FIG. 3. The description of these corresponding modules is not repeated for clarity. Each SVE node client, such as client 320, comprises a plurality of service clients. These include an SVM client 360, an STE client 362, an II client 364 an administration client 366, a pool client 368 and a configuration client 370. Note that each service client has its own API. These APIs are available, via the dispatch module, to clients of the dispatch module. Each client further communicates with a corresponding service server in the SVE node 304, including SVM server 374, STE server 376, II server 378, administration server 380, pool server 382 and a configuration server 384. The service clients and service servers all utilize the conventional Java Remote Method Invocation for communication.

The SVM client 360 and the corresponding SVM server 374 provide remote access to functionality of the logical volume manager for a node. Specifically the client and server provide methods to discover what metadevices and soft partitions exist on a node. Further methods are provided to create, grow and delete metadevices and to divide soft partitions from those metadevices on a node. All operations performed by the SVM service 390 are accomplished by calls to the CLI interface of the SVM service 390. The SVM server 374 translates the output of the CLI calls into objects that are returned to the SVM client 360 through RMI. In order to support multiple nodes sharing the same view of the actual storage, the SVM client 360 and the SVM server 375 provide access to SVM CLI options to perform operations that affect the persistent metadb database 252 (FIG. 2) and operations that affect only the view of the system in the memory of the node 304. Additionally, a method getTransactionID of the SVM client 360 gives access to the output of the SVM CLI call metadb-t on the SVM service 390. The getTransactionID method can be used on the SVM client 360 to determine if the SVE nodes are in synch with respect to the view of the actual storage in the node where the particular SVM service resides.

The STE client 362 and corresponding STE server 376 handle STE related requests. The STE server 376 translates SVE related method calls and arguments to the appropriate set of method calls for the STE service 392 as there is no one-to-one mapping between SVE and STE operations. The STE server 376 also maintains appropriate state information necessary to make translations for various SVE operations like LUN masking, LUN mapping etc.

The II client 364 and corresponding II server 378 provide a remote interface to handle the II imaging data service 394 on SVE nodes. Some of the common operations in managing a II service are create a volume set, delete a volume set, attach an overflow volume, add a volume set to a group etc. The II client 364 and the II server 378 do not enforce any II data service rules, they just act as passthroughs.

Other client/server pairs (not shown in FIG. 3) can be used to control other data services, such as service 396, in a similar manner.

The Node client 366 and corresponding Node server 380 provide a remote interface to send commands to a node (a host). Examples of those commands are reboot, poweroff and shutdown. The Node client 366 and Node server 380 also retrieve information about the host (such as hostid, node name, mirror node name).

The Pool client 368 and Pool server 382 provide a remote interface to storage pooling operations. These operations can be used during startup of the control process to determine what pools exist and what pool devices they contain. During normal operation, they can be used to update the dscfg database (252, FIG. 2) to add information about new pools and new additions to existing pools.

As in the case of the other SVE servers, the CFG server 384 running on a node is an RMI server object responsible for mapping remote calls from the service processor to an underlying software layer. In one embodiment, the lower software layer is a JNI wrapper for a SVE C library that implements the required behavior.

In a manner analogous to the previously described components, the SVE CFG client 370 is a "thin" client that exposes an (internal) API in order to mask the communication mechanism (currently RMI) between the service processor and the nodes in the SVE CFG implementation.

In order to properly handle situations when an error occurs on an SVE node, an asynchronous event mechanism is used in the illustrative system. In the illustrative embodiment under discussion, there are two classes of events that have been identified as critical: health monitor generated events, and data services generated events. However, the event framework is designed so that additional event types can be easily added.

The network storage health monitor (HM) 398 is a kernel module that maintains status information on behalf of other kernel modules and uses a "ping" scheme to monitor the health of the other nodes. The health monitor 398 is a conventional module and, therefore, its internal construction will not be further described in this application. The health monitor 398 typically provides a variety of events, but the SVE control software only monitors node "up" and node "down" events. The control software running on the service processor uses these events to update its knowledge about the current state of the nodes, so that it will attempt to communicate with a node during an API call only when that node is known to be "up." Therefore, these events are needed in order to ensure that a high-availability behavior of the system is correctly implemented.

The other type of event that is important for the SVE management software is "failover." Failover events are generated by the STE kernel module 392 as system events that are passed to a syseventd daemon 399 as indicated schematically by arrow 395. These events inform listeners, if any are present, that one or more SCSI LUNs (LUNs emulated via the STE driver) have been moved to a different host. SVE makes use of the conventional STE failover scheme for the SVE advanced LUNs. Consequently, the event mechanism is the only method for interaction between these components. Failover events are important because they allow the service processor to maintain up-to-date information about the state of the SVE LUNs, therefore ensuring the consistency of the system.

The event mechanism is implemented following the same client/server model as the other SVE clients/servers. In particular, the event server 386 is an RMI server object listening (on a socket) for events generated on the node on which it runs. However, there are two important differences between the event mechanism and the other SVE client/ server components. First, except for an initialization phase, there are no calls executed on the event client 372 as a result of an SVE API call. During the initialization phase, an initialization method and a synchronization method are called. The event client 372 is a standalone component in the sense that it has its own thread that is always blocked on a remote call. When an event is generated on the server side, the call will return and the event will be handled by updating the state info module 344. Then, a new remote call (asking for a new event) is made.

Figure 4:
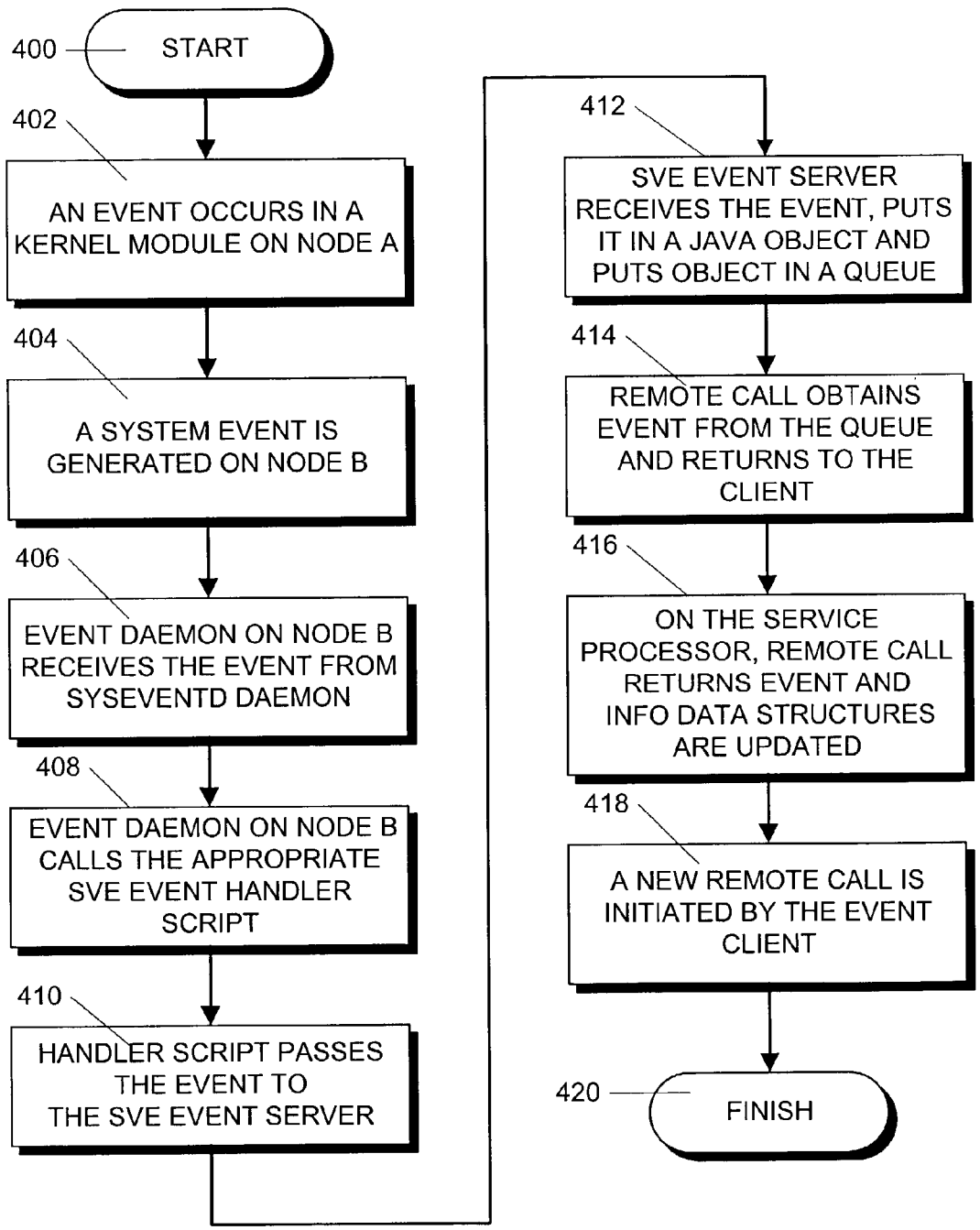
FIG. 4 is a flowchart that shows the steps in an illustrative process for handling events in the inventive system.

FIG. 4 is a flowchart that outlines the steps performed in processing an event. This process begins in step 400 and proceeds to step 402 where an event occurs in a kernel module on node A. Next, in step 404 a system event is generated on a node B, such as node 304 (node B may be the same node as node A) and received by the system event daemon syseventd (not shown.) In step 406, the data services event daemon 396 (the sysevendconfd daemon running on node 304) gets the event from the syseventd daemon. In step 408, the sysevendconfd daemon calls the appropriate SVE event handler. Each event handler is a simple shell script that is executed in the SVE node in which a failure occurred when the failure is detected. Then, in step 410 the handler script passes the event to the SVE event server 386 running on a well-known local port in node 304.

In step 412, the SVE event server 386 receives the event, encapsulates it in a Java serializable object and puts the object in a queue. Then, in step 414, the remote call (initiated by event client 372 running on the service processor) currently blocked on the queue will acquire the queue lock, will get an event from the queue, and then it will return to the client 372.

Next, in step 416, on the service processor, the remote call returns an event. In response to this event, the event client 372 informs the dispatch module 318 to cause it to refresh the cached state information in the state information module 344, and to notify the logger component 346 to log the failure. Finally, in step 418, a new remote call is initiated by the event client 372. The process then finishes in step 420.

The SVE client/server pairs make use of communication classes to invoke methods on the node servers. The basic premise of the SVE implemented in the SVE nodes is that the server side databases 252 and 254 (FIG. 2) contain the information that defines the system. In particular, the dscfg database 252 contains definitive information on all data services objects. Similarly, the metadb database 254 contains the definitive information about soft partitions and metadevices. The primary reason that these databases 252 and 254 define the system is that these databases represent the only persistent repository of this information. Any change that is not reflected in the databases will not survive a node shutdown.

In order to maintain synchronization when a command is issued, the databases 252 and 254 must be updated through one node and the kernel memory of all nodes that the command affects must also be updated. The nodes affected by a command are dependent on the type of command. For instance, the nodes of an SVE must have the same view of all of the storage controlled by the SVE. In the particular embodiment under discussion, the SVM data service is used to configure the actual storage devices into metadevices and then to further divide those metadevices into soft partitions that will be exported as LUNs. Since the SVM service on any particular node will use its kernel-resident view of the storage that it services to respond to new requests, steps must be taken to ensure that each node has the same view of current state of the storage devices. Therefore, all SVE commands that configure or de-configure storage using the SVM data service must be executed on all of the nodes of the SVE.

On the other hand, not all LUNs exist on every node. If a LUN is exported only from nodes 1 and 2, nodes 3 and 4 do not need to be aware of that LUN. Furthermore, commands, such as enable port commands, are required to be dispatched only to the node on which the particular port exists.

Figure 5:
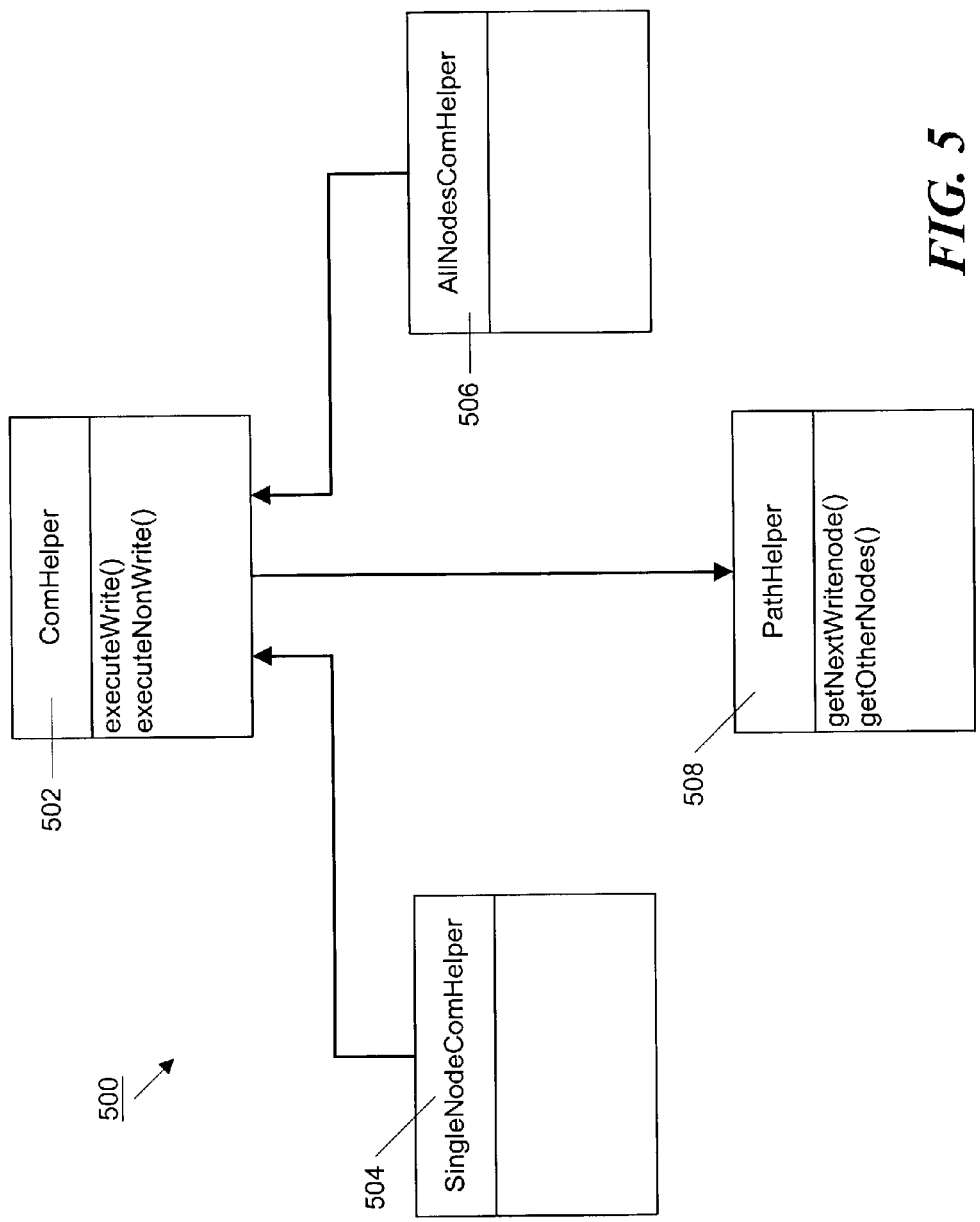
FIG. 5 is a class diagram showing the ComHelper and PathHelper classes.

Several classes 500, shown in FIG. 5 have been created to help control communication with SVE nodes. They include the ComHelper 502, SingleNodeComHelper 504 and AllNodesComHelper 506 classes. The methods in each class use threading and reflection to enable communication and to allow target determination, error handling and fault isolation to be handled in a consistent manner. As mentioned, actual communication with the nodes is achieved through Java Remote Method Invocation (RMI). Each of these classes further includes a MethodInfo object that encapsulates the information for a single remote method call. The ComHelper classes transport the MethodInfo object to the remote node, unpack the encapsulated information and use the information to make the remote method call.

ComHelper objects created from the ComHelper class 502 use PathHelper objects constructed from a PathHelper class 508 in order to determine on which SVE nodes a particular command should be invoked. The PathHelper class 508 encapsulates information concerning nodes on which commands that write the databases must be invoked (write nodes) and nodes on which the commands need not be invoked. The PathHelper 508 class also includes methods that track the nodes to which writes have been attempted. When a PathHelper object is constructed from a PathHelper class 508, either the class is passed an array of nodes with no requirement to write on any particular node or the class is passed a DPath variable which may require a write on a particular node or a write on one node from a set of nodes.

The PathHelper class 508 acts as an iterator of write nodes. It includes a getNextWriteNode( ) method. Successive calls to the getNextWriteNode( ) method will return a new write node from the set of possible write nodes. Additionally, nodes that are returned as write nodes are removed from the set of non-write nodes. When no possible nodes remain, the getNextWriteNode( ) method will return a negative one. A call to a getOtherNodes( ) method will return all nodes that are not explicitly write nodes and were not returned in response to calls to the getNextWriteNode( ) method.

In addition, prior to invoking a command on a node, a ComHelper object must check the status of a node. If the node status is not online, the command should not be executed on that node. Thus, prior to communicating with a particular node, the ComHelper object must determine if the communication can and should take place. If the target node status is "online", then the command will be executed on that node. However, if the node status is not online the command will not be invoked on the node and the ComHelper object will instead create and save a causal exception for later inclusion in an exception).

In order to invoke a method on a node, a ComHelper object uses an executeWrite( ) method. The executeWrite( ) method of the ComHelper object is always targeted at a single node. The executeWrite( ) method is intended to invoke commands that update the shared databases on the nodes and so only one update should occur at a time. The executeNonWrite( ) method however is used to call methods that update the kernel memory on each of the nodes. Since there are no shared resources in this case executeNonWrite( ) methods can be executed in parallel. ComHelper and AllNodesComHelper objects will automatically execute in parallel any method for which there is more than one target node for the executeNonWrite( ) method.

The use of threading in the ComHelper objects to perform the executeWrite( ) and executeNonWrite( ) methods allows the API implementation to isolate its clients from communication malfunction and from possible malfunctions of the servers that cause them to hang. Threading allows time-out mechanisms to be implemented to prevent the client programs from stalling in response to these problems. Threading also ensures that no remote communication is performed during the client main thread of execution. Thus, if difficulty is encountered and detected, an exception can be returned to the client.

The ComHelper objects provide common error handling code for all calls to the servers with the executeWrite( ) and executeNonWrite( ) methods. There are several types of exceptional conditions that can arise during the invocation of server-side methods in the SVE nodes. First, there are server specific errors that can arise based on invalid arguments presented to the servers or unexpected conditions on the servers. These exceptions indicate a failure of the actual server method. The second type of server-specific error is a communication exception. In the illustrative embodiment, these latter errors are related to specific RMI exception types that represent failures to communicate with the servers. The first type of exception is somewhat simpler in that the servers should only return them in the instance of a failure. The second type f exception is more problematic because it is not possible to know whether the command has succeeded or not.

When communication errors are encountered, a ComHelper object will mark the corresponding node as having failed to communicate. The state of this node is then undetermined. It is not possible to allow continued communication with the affected node until the state is again known. generally, this state will not be known until a resynchronization has occurred.

In addition to checking for and updating the state of the nodes in response to failed commands, the ComHelper objects are responsible for translating server side exceptions into meaningful exceptions that will be thrown by the API methods. For example, a command execution may require calling multiple servers on multiple nodes. It is not desirable (nor in fact possible when parallel calls are pending) for a single failure to cause the immediate termination of the command. Instead it is necessary to collect returned exceptions and aggregate them in a meaningful way so that the client can ascertain whether the operation has succeed in part or failed in total.

Thus, the ComHelper objects collect the independent exceptions returned from the clients and build either an SveFailedOpException or an SveIncompleteOpException depending on whether or not the operation was partially successful. As discussed above, the premise of the SVE is that the persistent databases contain the information that defines the system. If any exceptions are thrown by the servers, the ComHelper objects consider the overall operation to have succeeded partially only if all necessary database writes were achieved. If all database writes were achieved, an SveIncompleteOpException is thrown by the executeNonWrite( ) method of the ComHelper object.

Figure 6A:
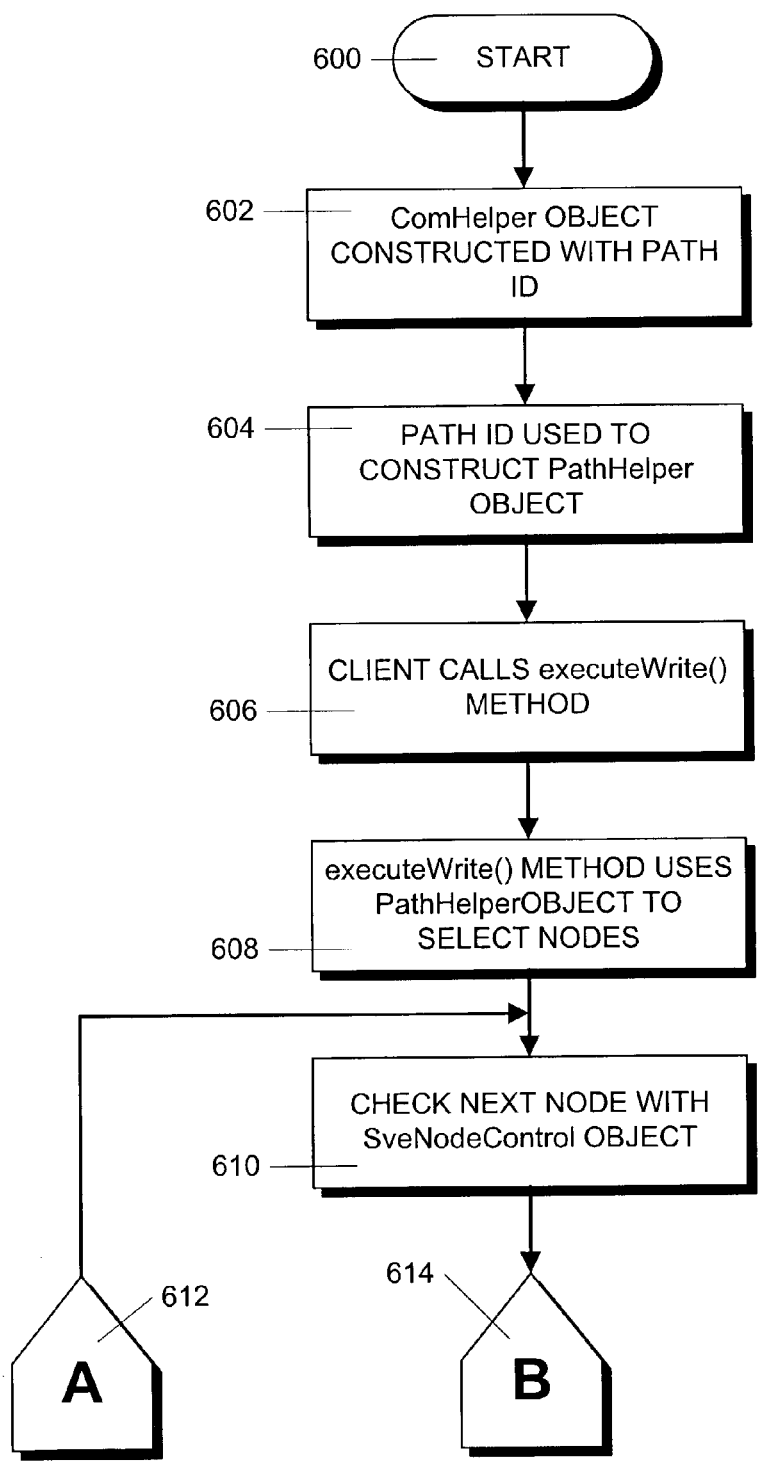
FIGS. 6A and 6B, when placed together, form a flowchart showing the steps in an illustrative process for executing a remote method call using ComHelper and PathHelper objects.
Figure 6B:
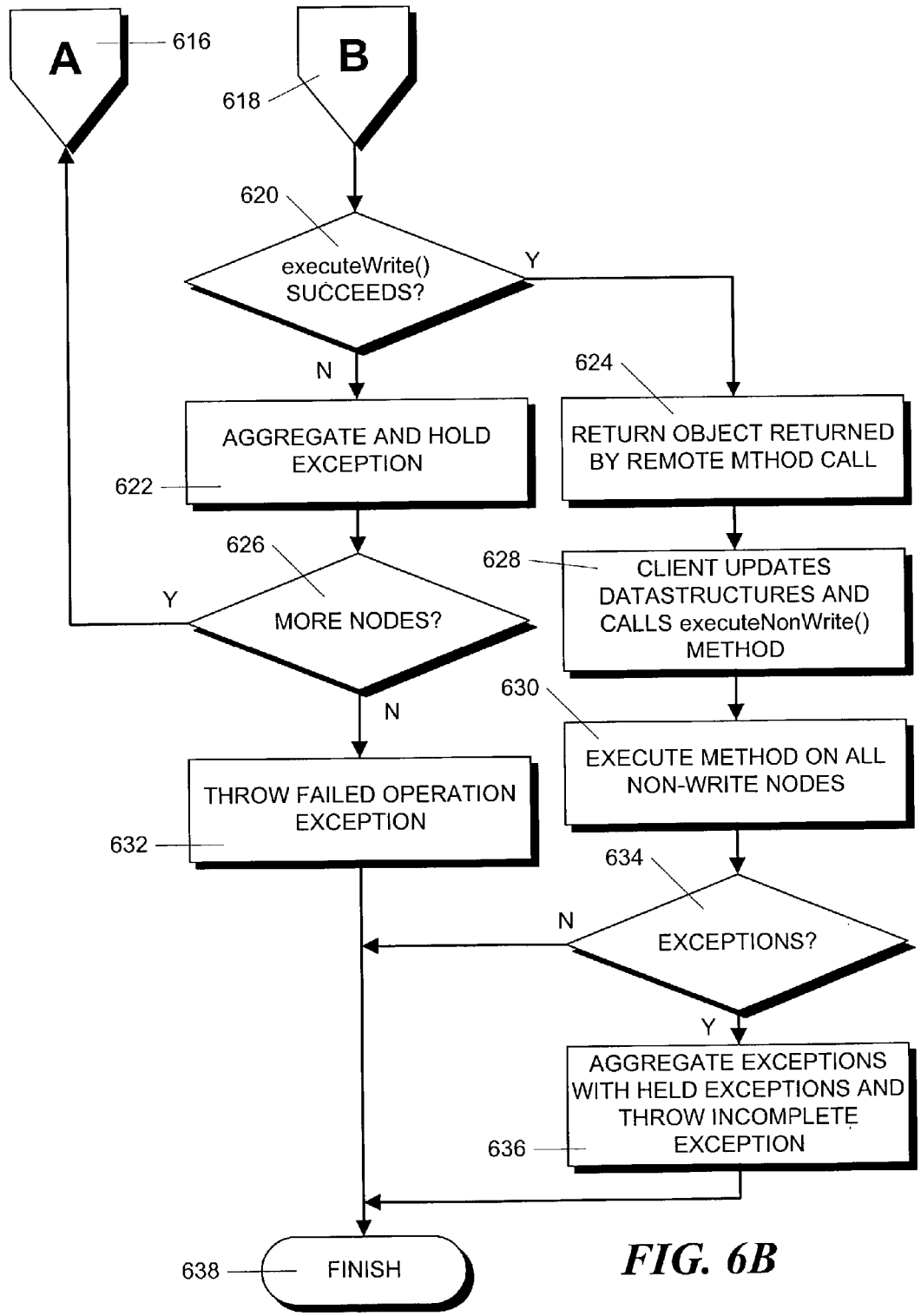

FIGS. 6A and 6B, when placed together, form a flowchart that illustrates the steps in the creation and use of a ComHelper object to execute a remote command. This process begins in step 600 and proceeds to step 602 where an object of the class ComHelper is created with a path id that is passed in when the ComHelper object is constructed. This path id is used to construct a PathHelper in step 604. The PathHelper object will later be used to determine what nodes must be called.

In step 606, the client of the ComHelper object then calls the executeWrite( ) method in the ComHelper object passing in an array of target objects, a MethodInfo object that encapsulates the remote command to be executed and a reference to a SveNodeControl object (described below.) The executeWrite( ) method then uses the PathHelper object, in step 608, to retrieve a list of nodes to which a write operation will be attempted.

In step 610, the ComHelper object checks with the SveNodeControl object to determine the status of the first node on the node list. The process then proceeds, via off-page connectors 614 and 618, to step 620 where, if the node is status is "online", an attempt is made to execute the method encapsulated in the MethodInfo object on a target object corresponding to the appropriate node. If the node is not "online" or the latter method throws an exception, then the process proceeds to step 622.

In step 622, if the node is not "online" an exception is created. However, neither the created exception, nor any exception thrown by the remote method is thrown at this point. Instead, the exceptions are held internally in the ComHelper object. The held exceptions and any new exceptions encountered during a subsequent call to executeNonWrite( ) (described below) will be aggregated in an incomplete operation exception (SveIncompleteOpException) that will be thrown in response to that call.

The process then proceeds to step 626 where it is determined whether any more nodes exist on the PathHelper object node list. If there are more nodes, the process proceeds, via off-page connectors 616 and 612, back to step 610 where the next node on the list is checked with the SveNodeControl object. Operation proceeds in this manner until either execution of the remote method succeeds or all nodes on the node list have been examined.

If all of the write nodes on the PathHelper list are unavailable or throw exceptions, and, in step 626, it is determined that no more nodes exist, then the process proceeds to step 632 where the possible multiple exceptions are aggregated in a failed operation exception (SveFailedOpException) and thrown. In addition to being aggregated into a containing exception all exceptions received (or created in response to a down node) are logged. The process then finishes in step 638.

If the remote method succeeds on a node, the process proceeds to step 624 where the executeWrite( ) method returns the object returned by the method that was invoked. In step 628, the client of the ComHelper then updates appropriate data structures on the Service Processor and then calls the executeNonWrite( ) method in the ComHelper object. The executeNonWrite( ) method will execute the method encapsulated in the MethodInfo object on all of the non-write nodes in parallel as set forth in step 630. After all of these methods return from the servers (or after a time-out) a determination is made whether any exceptions were generated or were being held from step 622. Any such exceptions are aggregated into an SveIncompleteOpException that is logged and thrown in step 636. At this point, the exception is an SveIncompleteOpException because at the very least the executeWrite method must have succeeded for one node. The process then finishes in step 638.

As discussed above, the definitive information regarding the system resides in the persistent server-side databases; however, it is important to note that transient effects can be induced if the states of these databases are assumed to be identical to the service processor state while any one of the nodes has a different internal view of the system. Therefore, it is important for the state information on the service processor to reflect the most restrictive state on the underlying systems. This leads to some ordering constraints concerning when the service processor state is updated.

For example, potential problems exist for creation and deletion of LUNs and metadevices. Property changes and the addition or removal of a mask to a LUN do not represent possible sources of errors because their state can be viewed independently on each node. Until synchronization can be regained the property or mask would not be consistent across the nodes but there is no risk of the introduction of an error through the re-allocation of a common resource (a simple example is a partition id).

Consequently, during creation events, after the database has been written, the service processor state is updated even if the command was not successfully executed on all of its target nodes. This is necessary to insure that a subsequent creation command would not interfere with the partially completed one. On the other hand during deletion, if any of the nodes failed to perform the command the state can not be updated until all nodes are in synch. In this way, if, as a result of a partial failure, an object exists on one node but not on others no conflicting object will be created on the other nodes. By enforcing this ordering configuration commands can be executed on nodes that have been continually responding since the last resynch even when there are known problems with other nodes.

Figure 7:
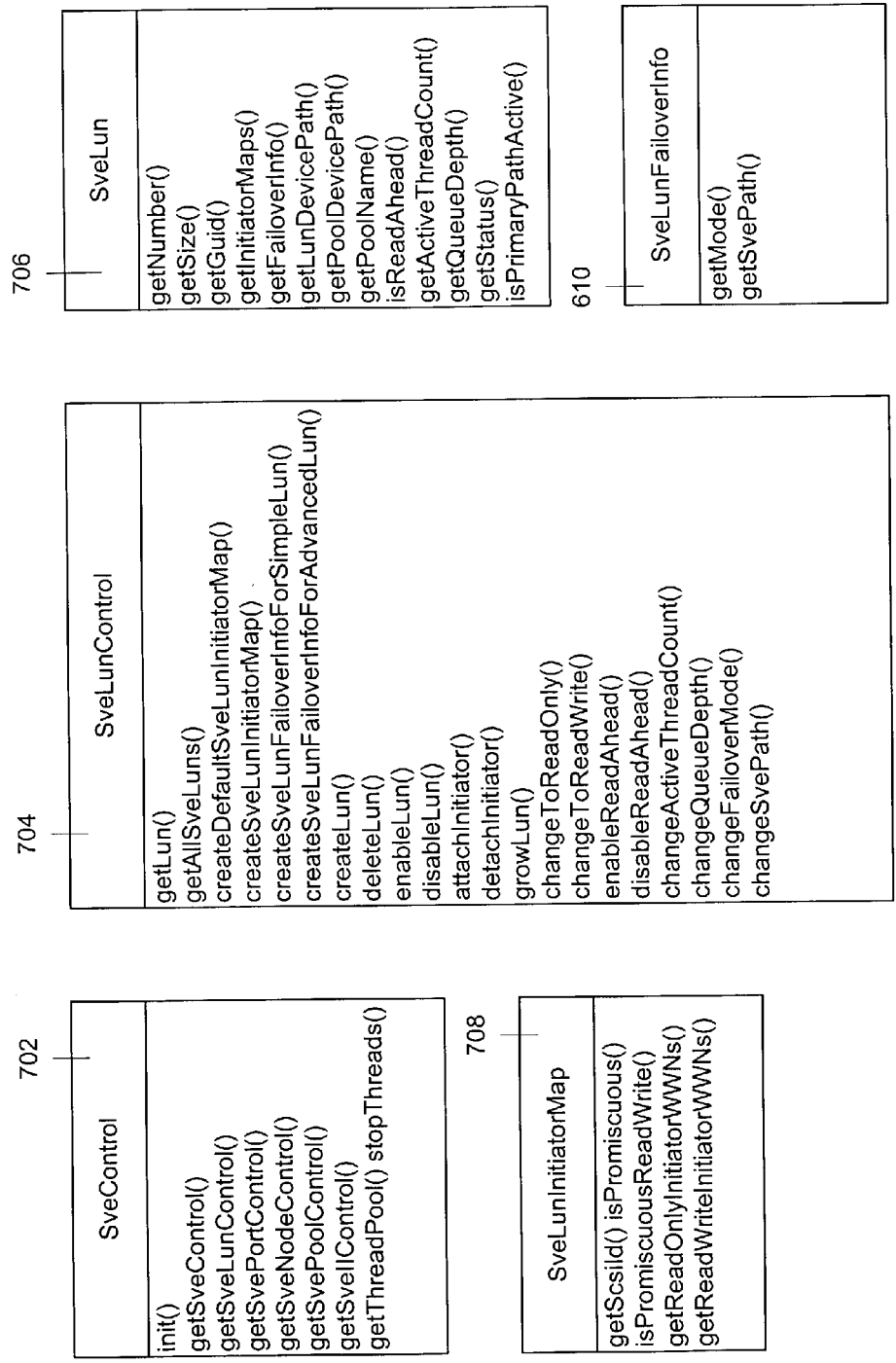
FIG. 7 shows several interfaces, including the SveControl and SveLunControl interfaces and related classes that form portions of the SVE API and are used to perform operations affecting LUNs.

The dispatch module 318 and the state info module 344 are implemented by control objects constructed from control classes (SveControl, SveLunControl, SvePortControl, SvePoolControl, SveIIControl, SveNodeControl and SveConfig) containing methods that are called by the clients of the API 316. A set of information classes is used as arguments and responses from the control classes. There are two main stages in the life cycle of the control objects: startup and normal operation. During startup, the control objects collect information from the SVE servers so that, during normal operation, they can check the legality of operations before contacting the SVE servers. During normal operation, the control objects maintain their consistency with the SVE nodes by updating their state as operations are executed. The control classes 700 are shown in FIG. 7 and each class is an implementation of an interface from the API package.

The SveControl class 702 is actually part of the SVE API package. It includes an initialization method (init( )) and a static method getSveControl( ) through which clients of the API can obtain an instance of the class. Such an instance manages the relationships between the other control classes and provides an interface through which clients can obtain objects that implement the other interfaces of the API by calling the methods getSveControl( ), getSveLunControl( ), getSvePortControl( ), getSveNodeControl( ), getSvePoolControl( ) and getSveIIControl( ). The instance also manages the thread pool using the methods getThreadPool( ) and stopThreads( ).

A SveLunControl object is created from the SveLunControl class 704 by calling the getSveLunControl( ) method in an SveControl Object. The SveLunControl object provides the methods shown in FIG. 7 to create, delete, enable and disable LUNs, change LUN properties and map and mask LUNs to initiators. In FIG. 7, and the subsequent FIGS. 8–10, method arguments have been omitted for clarity and methods whose purpose is obvious from the method name are not described in detail. The SveLunControl object primarily interacts with STE clients for each of the nodes to achieve LUN control but also interacts with the SvePoolControl object (described below) to create and delete the soft partitions that are exported by the LUNs.

SveLun objects are created from SveLun class 706 by calling the createLun( ) method of the SveLunControl object. Each SveLun object encapsulates all information about a particular LUN. These objects can be retrieved by calls to either the getLun( ) method or the getAllLuns( ) method in the SveLunControl object.

Similarly, SveLunInitiatorMap objects are created from SveLunInitiatorMap class 708 by calling either the createSveLunInitiatorMap( ) method or the createDefaultSveLunInitiatorMap( ) method of the SveLunControl object. Each SveLunInitiatorMap object encapsulates all information about a particular LUN initiator map. These objects can be retrieved by calls to the getInitiatorMaps( ) method in the SveLun object.

Finally, SveLunFailoverInfo objects are created from SveLunFailoverInfo class 710 by calling either the createSveLunFailoverInfoForSimpleLun( ) method or the createSveLunFailoverInfoForAdvancedLun( ) method of the SveLunControl object. Each SveLunFailoverInfo object encapsulates all information about failover information a particular LUN. These objects can be retrieved by calls to the getFailoverInfo( ) method in the SveLun object.

Figure 8:
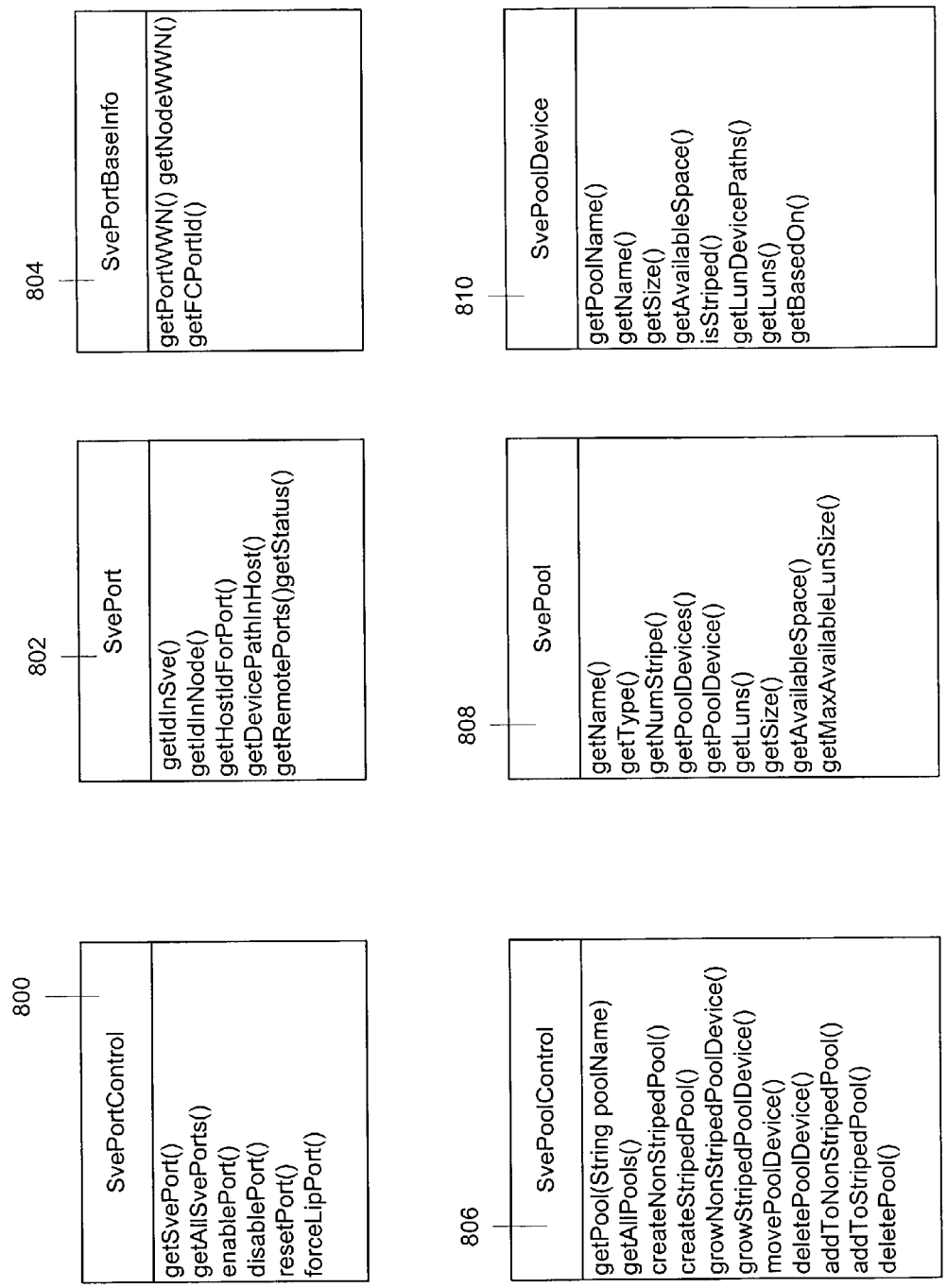
FIG. 8 shows several interfaces, including the SvePortControl and SvePoolControl interfaces and related classes, that form additional portions of the SVE API and are used to control ports and pools.

An SvePortControl object created from the SvePortControl class 800 in FIG. 8 is used to manage target ports on the SVE Nodes. The SvePortControl object works with STE clients to gather information about the ports on each node and maps that local port information to global ports that are referred to in the API. SvePort objects are maintained for each port in the system and can be retrieved by users of the API through the getAllSvePorts( ) and getSvePort( ) methods. Methods are also provided to enable, disable, reset and force lip the ports (enablePort( ), disablePort( ), resetPort( ) and forceLipPort( ), respectively.)

The SvePort Object encapsulates all information for an SVE port. It is created from the SvePort class 802 by the SVE software. The SvePortBaseInfo class encapsulates information concerning each port. It is created from the SvePortBaseInfo class 804.

An SvePoolControl object created from the SvePoolControl class 806 is used to manage the backend storage. The SvePoolControl object interacts with Pool clients and SVM clients on the nodes to determine what pools exist in storage and to modify the existing pools. An SvePoolControl object maintains SvePool objects created from the SvePool class 808 from which storage is allocated to LUNs. These objects are created by the createNonStripedPool( ) and createStripedPool( ) methods. The objects can also be retrieved by the getPool( ) and getAllPools( ) methods. The SvePoolControl object includes methods to add new devices to pools, move devices between pools, delete devices, grow existing devices and create and delete soft partitions (growNonStripedPoolDevice( ), growStripedPoolDevice( ), movePoolDevice( ), deletePoolDevice( ), addToNonStripedPool( ), addToStripedPool( ) and deletePool( ), respectively.)

An SvePoolControl object can also manipulate SvePoolDevice objects created from the SvePoolDevice class 810. Each of these objects represents objects from which LUNs are carved out in a pool. Each pool device is an SVM metadevice that is part of a pool. The SvePoolDevice object encapsulates information regarding the pool device and soft partitions created on the device.

Figure 9:
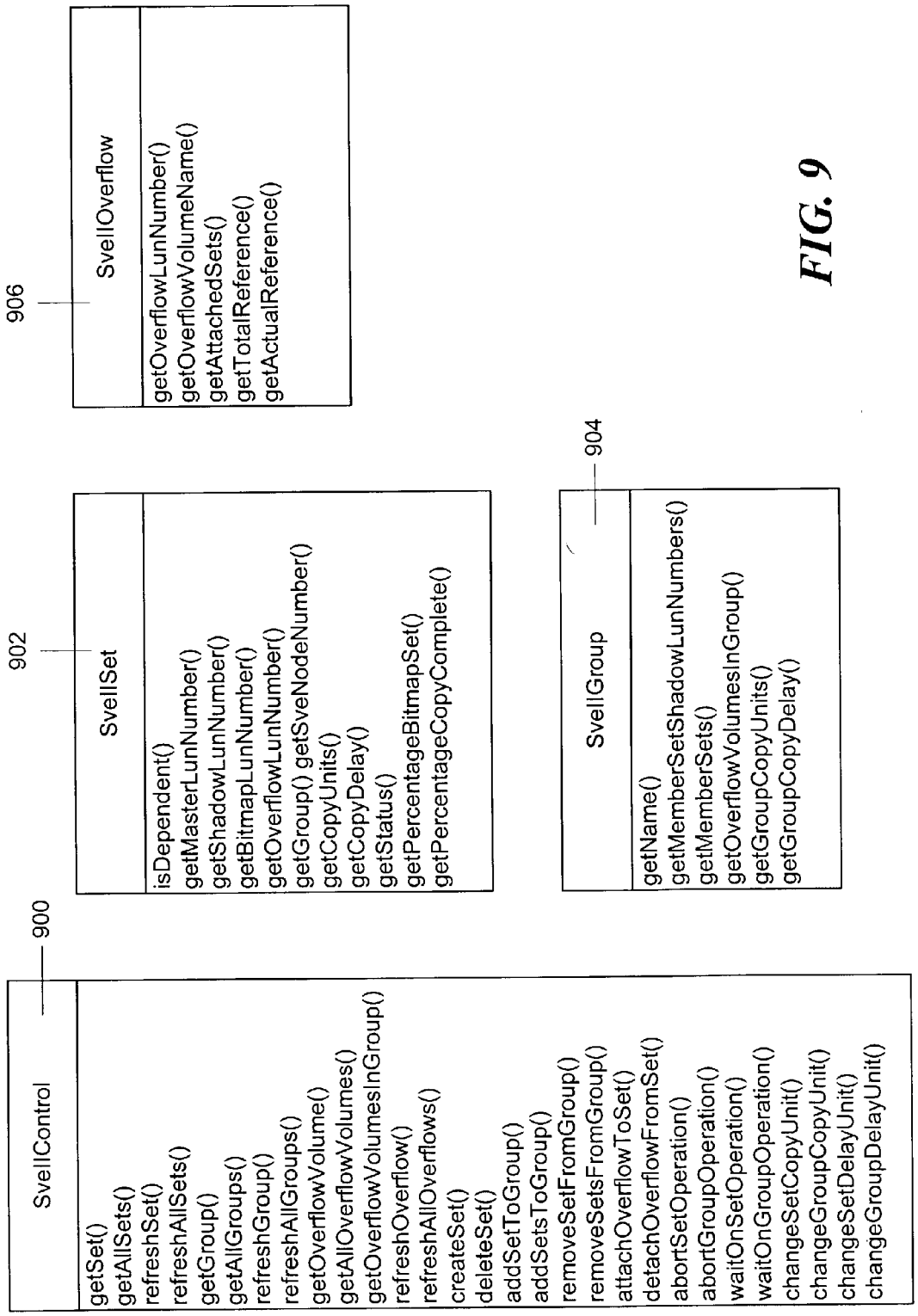
FIG. 9 shows the SveIIControl interface and related classes that form further portions of the SVE API and are used to control the II data imaging service.

An SveIIControl object created from the SveIIControl class 900 shown in FIG. 9 is used to manage the II data imaging service on SVE nodes. The SveIIControl object interacts with II clients to create master, shadow and overflow LUNs. These three elements correspond to an II set represented by an SveIISet Object created from the SveIISet class 902. Methods in the SveIIControl object allows II Sets to be created, refreshed and deleted (createSet( ), refreshSet( ), refreshAllSets( ) and deleteSet( ) methods.)

The getStatus( ), getPercentageBitmapSet( ) and getPercent-CopyCompletion( ) methods in the SveIISet object return values at the time when the object was instantiated. To obtain the values later, an API user should call the getSet( ) method in the SveIIControl Object. The set objects can also be retrieved with the getAllSets( ) method.

The sets could be of two types: independent and dependent. In order to create a valid II Set, the following rules must be followed:
1. when an II set is created, the master LUN, shadow LUN, bitmap LUN and type must be specified for the set.
2. a master LUN cannot be used as a shadow, bitmap or overflow LUN in any existing sets.
3. a shadow LUN cannot be used as master, shadow, bitmap or overflow LUN in any existing sets.
4. a shadow LUN has to be greater than or equal to in size with the master LUN, except for dependent II sets.
5. a bitmap LUN should not be used as master, shadow, bitmap or overflow LUN in any existing sets.
6. the master, shadow and bitmap LUNS must be advanced LUNs with the same SVE node as primary (that is, master, shadow and bitmap LUNs should have same SvePath.)
7. an overflow LUN cannot be used as a master, shadow or bitmap LUN in any existing sets.
8. an overflow LUN can be attached to an II set only if the II set is a dependent II set and the shadow LUN size is less than the master LUN size.
9. an overflow LUN has to be an advanced LUN, and it can be attached only to II sets whose master, shadow and bitmap LUNS has the same SVE node as primary.
10. only II sets whose primary SVE nodes are the same, can be put together in an II group. In other words, the member sets of an II group has the same SVE node as primary.

II Sets can be placed in II Groups in order to perform operations on each set in the group with a single command. Each II Group is represented by an SveIIGroup object created from an SveIIGroup class 904. The SveIIGroup class includes methods for retrieving information relating to each group including the group name, members sets, member set shadow LUN numbers, overflow volumes and group copy units and delays. The SveIIControl object includes methods for manipulating groups including retrieving the group objects (getGroup( ) and getAllGroups( )), refreshing the member sets in a group or all groups (refreshGroup( ) and refreshAllGroups( )), adding and removing one or more sets to a group (addSetToGroup( ), addSetsToGroup( ) and removeSetFromGroup( ) and removeSetsFromGroup( ))

Finally, each overflow LUN is represented by an SveIIOverflow object created from an SveIIOverflow class 906. This object includes methods for retrieving information concerning the overflow LUN it represents, including the LUN number, volume name, attached II Sets and the total and actual reference. The getUsed( ), getTotalReference( ) and getActualReference( ) methods return values at the time when the SveIIOverflow object was instantiated. To get the most recent values, the API user must call the SveIIControl object method getOverflowVolumes( ).

Figure 10:
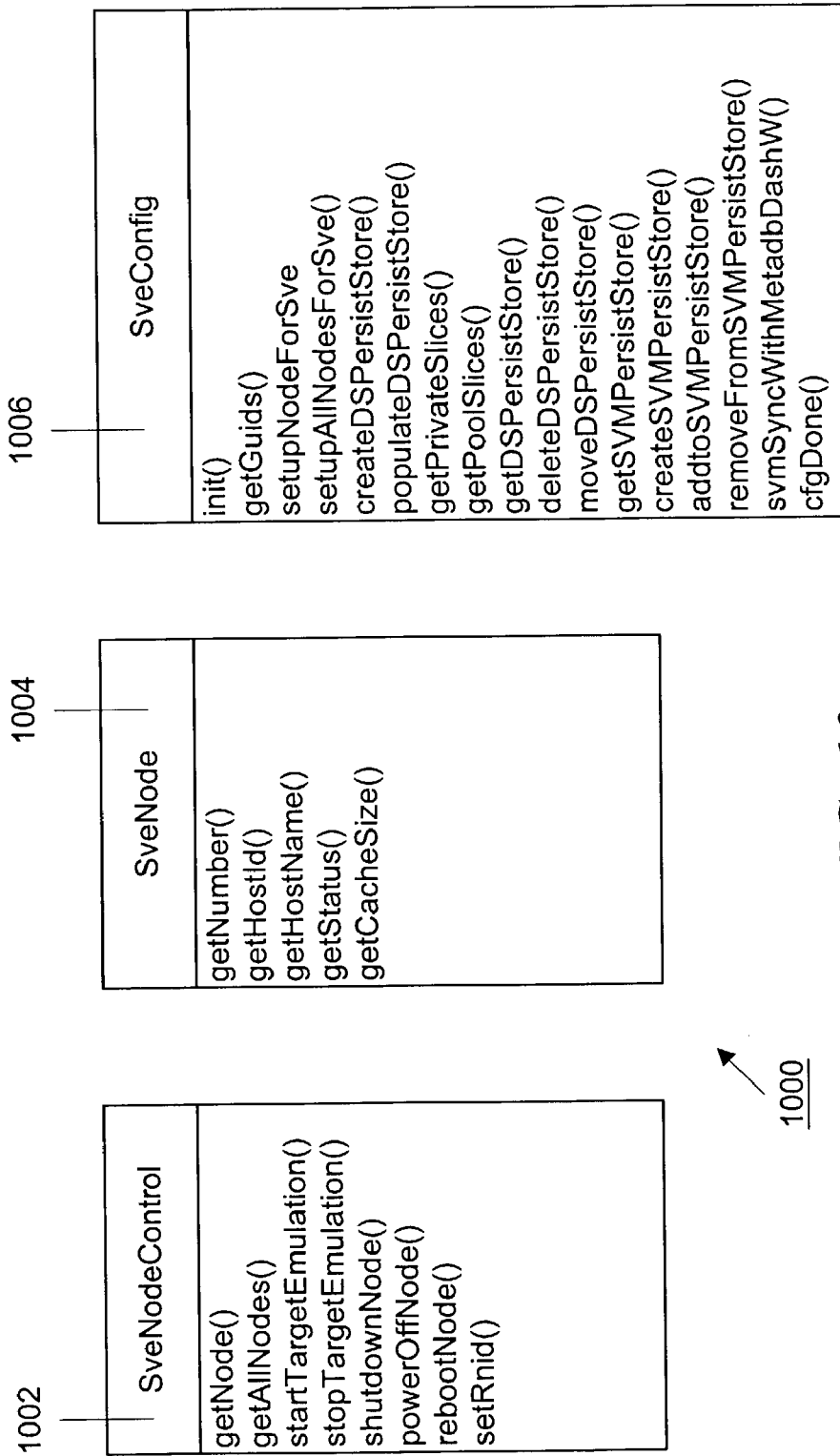
FIG. 10 shows the SveNodeControl interface and a related class that form further portions of the SVE API and are used to control the SVE nodes.

Several additional classes 1000 are shown in FIG. 10. An SveNodeControl object created from the SveNodeControl class 1002 is used to manage the SVE nodes. The SveNodeControl object interacts with Node clients to collect information about the nodes that is then held in SveNode objects. These objects are available through the API methods getNode( ) and getAllNodes( ). Additional methods allow users to start and stop target emulation on a node, shutdown and reboot nodes and set Rnid for all of the nodes (startTargetEmulation( ), stopTargetEmulation( ), shutdownNode( ), powerOffNode( ), rebootNode( ) and setRnid( ), respectively.) SVE node information is encapsulated in SveNode objects constructed from the SveNode Class 1004. This class contains several "get" methods to retrieve the information store in the node object.

In addition, to the SveControl object, the API has a configuration object, SveConfig constructed from SveConfig class 1006. Once the system is configured via the SveConfig object, it is expected that most of the management will be done using the SveControl object. Basic configuration must be performed using an SveConfig object, before the control object can be successfully initialized. Additional configuration operations (such as physical storage addition) can be performed later. In other words, there is no point in trying to execute control operations (such as creating a LUN) unless the basic configuration phase (that includes setting up the storage) has ended.

When they are instantiated, many of the SVE servers initially retrieve data from the underlying layers. The ability to retrieve such data assumes that certain configurations steps have been already completed, otherwise the server initialization will fail. The mechanism used by the SVE software running on the nodes to decide when to attempt to start these servers is described below The methods defined in the SveConfig API can be classified as storage configuration methods, data services persistent configuration methods, SVM configuration methods other methods. The storage configuration methods provide the functionality required in order to add new storage to an SVE system. More precisely, they allow the user the system administrator) to specify which of the connected storage devices should fall under SVE control. After this configuration step is done, the user can add the new storage to a newly created SVE pool or an existing SVE pool, using the SvePoolControl API discussed above. Only once these steps have been completed, can a LUN be created.

When the API user wants to add more storage under SVE control, he or she must specify a GUID (Globally Unique ID) as an argument for the corresponding API call. Another API method (getGuids( )) can be used to retrieve a list of GUIDs corresponding to all the available storage. When a new device is brought under SVE control, two types of slices are created: private slices and pool slices. A private slice may be used for storing data service and SVM persistent information. A pool slice may be added later to an SVE pool and then used for carving LUNs. Methods in the SveConfig object (getPrivateSlices( ) and getPoolSlices( )) provides two means for retrieving a list of available slices (one method for each slice type).

As shown in FIG. 2, all data services running on the SVE nodes store configuration information at a common location on the shared storage network. The location for storing this vital information, shown as the dscfg database 252 in FIG. 2, can be specified by the user. The SveConfig object includes methods to retrieve the current dscfg location, to change the location, to delete the dscfg database 252 and to populate the dscfg database 252 (getDSPersistStore( ), moveDSPersistStore( ), deleteDSPersistStore( ) and populateDsPersistStore( ), respectively). The last method ensures that the dscfg database 252 is correctly initialized with all the information required by the data services in order to operate properly.

Similarly to the Data Services, SVM also needs to persistently store configuration information on the shared storage. This information is stored as a metadb database 254 that is typically replicated on multiple disk slices. The API provides method to create a metadb database 254, to add a metadb database 254 (a replica), to delete a metadb database 254 or to remove a metadb database 254 (createSVMPersistStore( ), addtoSVMPersistStore( ), removeFromSVMPersistStore( ), respectively). In all cases, the user must specify the corresponding private disk slices.

The SveConfig object needs to be initialized by specifying the hosts that constitute the SVE nodes. When the basic configuration operation is finished, the user must call the cfgDone( ) method. A "basic configuration" means that the minimum steps that are necessary in order to generate initial information required by the SVE servers running on the nodes. At a minimum one device should be brought under SVE control, the dscfg database 252 must be created and populated and a metadb database 254 must be created. Calling the cfgDone( ) method will result in a remote call that will signal the control software running on each node that is it safe now to start the SVE servers. Any attempt to initialize the SveControl object before this step has been completed will result in an exception caused by a failure to contact the SVE control servers that have not yet started. Further configuration via the SveConfig object is of course allowed.

Figure 11:
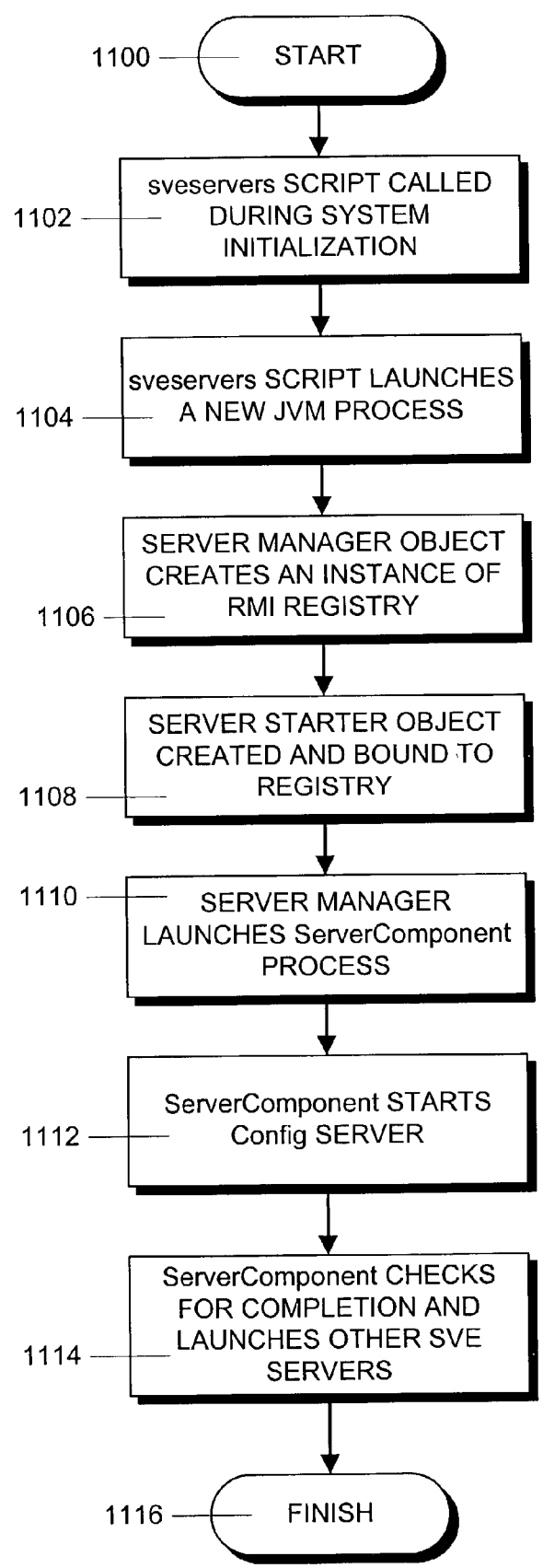
FIG. 11 is a flowchart showing the steps in an illustrative process for initializing and restarting the SVE servers.

The initialization process involves initialization and restarting the SVE servers running on the nodes. This process is illustrated in FIG. 11 and provides a mechanism for the service processor to remotely (re)start the SVE servers, should one of them crash and bring down the whole Java Virtual Machine (JVM) in which the servers are running. This is done by having a separate RMI server, called a Server Starter, that runs in a different JVM. Since this is a thin object whose sole purpose is to fork the second JVM (which includes all the "real" SVE servers), the likelihood of this JVM crashing is minimal, hence the chances of needing local user intervention on a SVE node are also minimal. In order to limit the number of virtual machines running, the RMI Registry service is run in the same JVM as Server Starter, instead of in a separate process.

An even more severe case occurs when the Server Manager process (the process including the RMI Registry and the Server Starter RMI object) fails for some reason. In this case, the local script that is responsible for launching the SVE software on the node (called the sveservers script) must be called. However, the process shown in FIG. 11 also can initialize the system even in this more severe case. The process starts in step 1100 and proceeds to step 1102 where the sveservers script is called either directly or as part of the system initialization sequence after a reboot. Next, in step 1104, the sveservers script launches a new JVM process by instantiating the Server Manager class. In step 1106, the Server Manager object creates an instance of the RMI Registry. Then, in step 1108, the Server Manager object creates a Server Starter object and binds it to the registry.

Next, in step 1110, the Server Manager object launches a new process (from the ServerComponent class). The ServerComponent object starts the Config Server in step 1112. Finally, in step 1114, the ServerComponent object checks to determine whether the configuration step has been finished by searching for a file at a well-known location. If the configuration process is finished, the ServerComponent object sets a CFG_DONE flag accordingly and if CFG_DONE is set, the ServerComponent object launches all the other SVE servers (creates the objects and binds them to the registry)

Figure 12A:
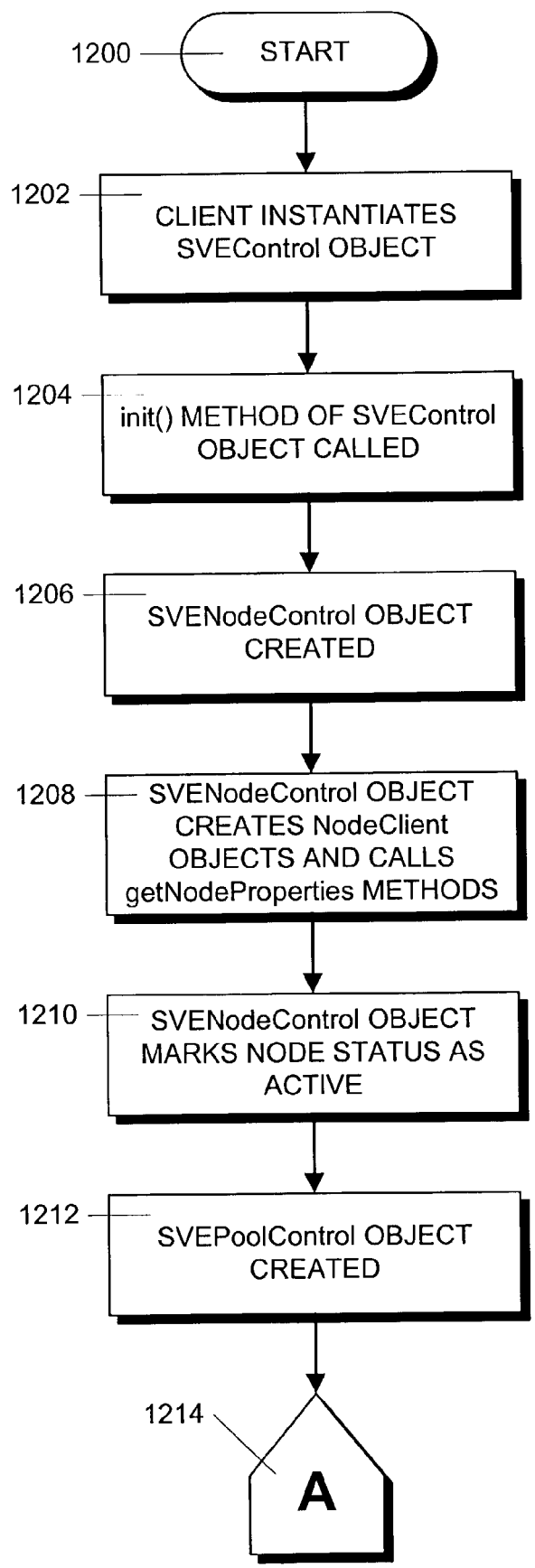
FIGS. 12A–12C, when placed together, show the steps in an illustrative process for initializing the control objects and state information.
Figure 12B:
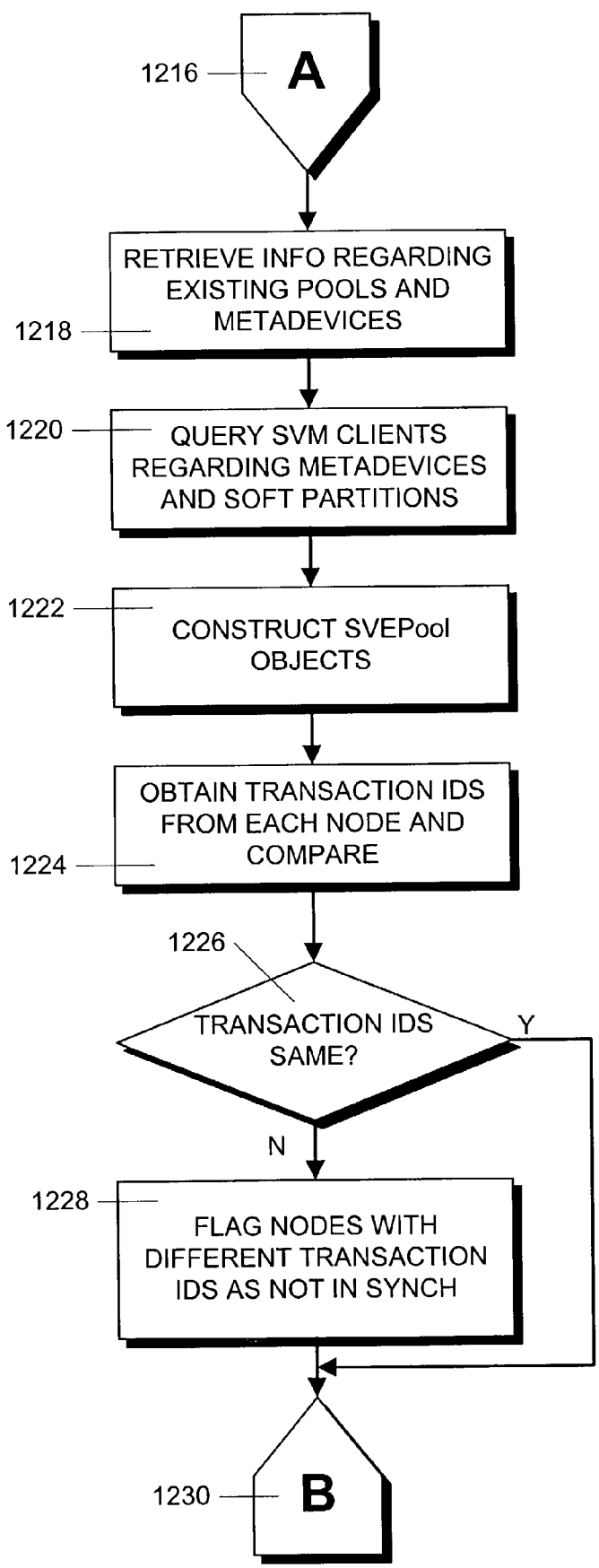
Figure 12C:
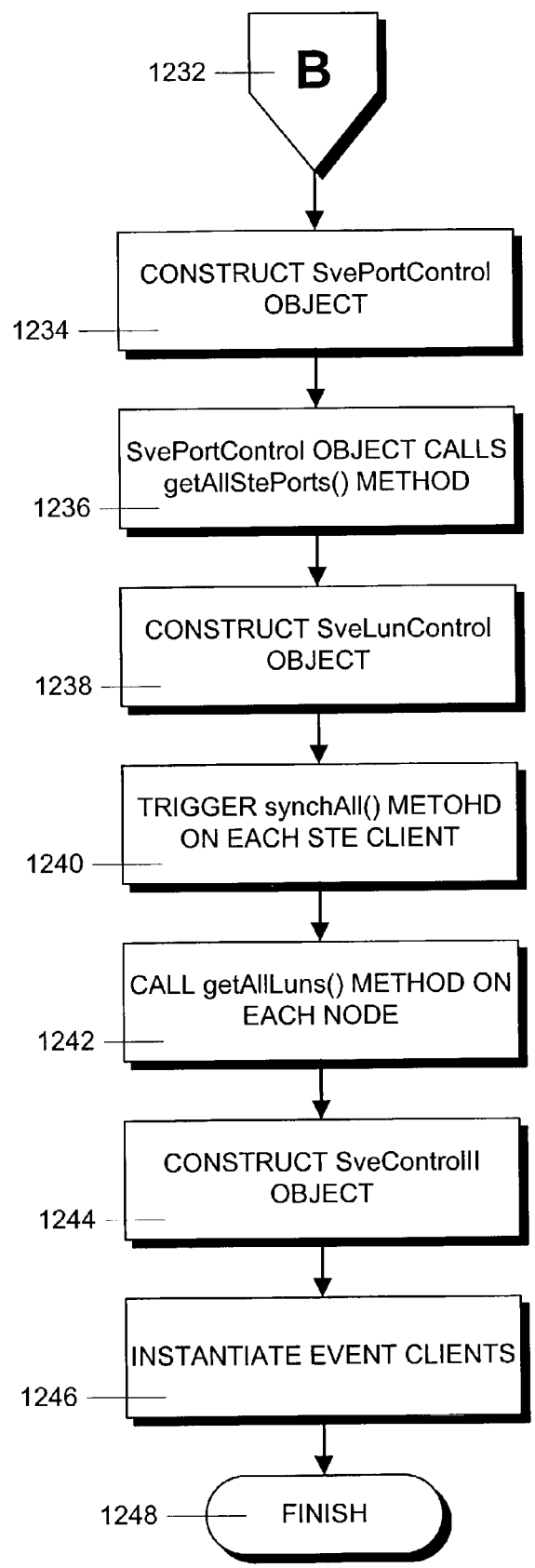

FIGS. 12A–12C, when placed together, form a flowchart that illustrates the steps in a process that initializes the SveControl object and the State Info in the Service Processor. This process begins in step 1200 and proceeds to step 1202 where a client instantiates the SveControl object in order to use the API to control the SVE. This is done by calling the method getSveControl( ). In step 1204, the init( ) method of the SveControl object is called with an array of hostnames. Each of the other control classes will communicate with servers on the named nodes to build an accurate picture of the current system state.

Then, in step 1206, the SveControl object constructs a new SveNodeControl object passing in the hostnames array. In step 1208, the SveNodeControl object constructs a NodeClient object for each of the named hosts and calls the getNodeProperties( ) of each NodeClient object to retrieve information about the node and its relationship with a pair node. The SveNodeControlImpl represents this information with in SveNode objects and marks the current status of the nodes as active in step 1210.

Next, in step 1212, the SveControl object then constructs an SvePoolControl object that will interact with SveNodeControl object to determine what nodes to contact. The SvePoolControl object coordinates information from two sources: Pool clients and SVM clients. The process then proceeds, via off-page connectors 1214 and 1216, to step 1218 where the SvePoolControl object retrieves information concerning existing pools and the metadevices that they include from the Pool clients for each node.

Then, in step 1220, the SvePoolControl object queries the SVM clients for each node to get information about metadevices and soft partitions that have been carved out of them. The information from these sources is used, in step 1222, to construct SvePool objects that encapsulate the information and are held by the SvePoolControl object. In addition to constructing initial service processor side information about the state of pools and metadevices on the nodes, the SvePoolControl class must verify that each node has the same kernel resident view of the backend storage. In order to do this, the transaction IDs from each node are obtained in step 1224 and compared. If, as determined in step 1226, the transaction IDs are all the same, the nodes are in sync and the process proceeds, via off-page connectors 1230 and 1232, to step 1234. Alternatively, if they are different, in step 1228, the nodes with the lowest numbered transaction IDs will be flagged as not in synch, indicating that they will require a reboot. The process then proceeds, via off-page connectors 1230 and 1232, to step 1234.

In step 1234, the SveControl object constructs an SvePortControl object. The SvePortControl object, in step 1236, calls the getAllStePorts( ) method on the STE client on each node to discover the ports that the node exports. Each node has two ports that are locally addressed as port0 and port1. The SvePortControl object maps these local port numbers to SVE wide port IDs based on the node IDs collected by the SveNodeControl object during its initialization. SvePort objects are then created for each port. The SveControl object next constructs an SveLunControl object in step 1238. The SveLunControl object then triggers the synchAll( ) method on each STE client, in step 1240, in order to force the active configuration on each node into agreement with the configuration recorded in the dscfg database.

In step 1242, the SveLunControl object then calls the getAllSteLuns( ) method on the STE client on each of the nodes to gather information concerning what LUNs are currently present in the system. An SteLun object includes the device path of the volume that the LUN exports and the device path is used to correlate the SteLun with an SVM soft partition. All of this information is then aggregated into SveLun objects.

In step 1244, the SveControl object next constructs an SveIIControl object that will retrieve information about all of the II Sets and II Groups that are present in the SVE. Finally, in step 1246, the SveControl object instantiates the Event Clients. The complete state of the system is now known on the service processor and is in sync throughout the stack. Normal operation can now proceed.

Figure 13:
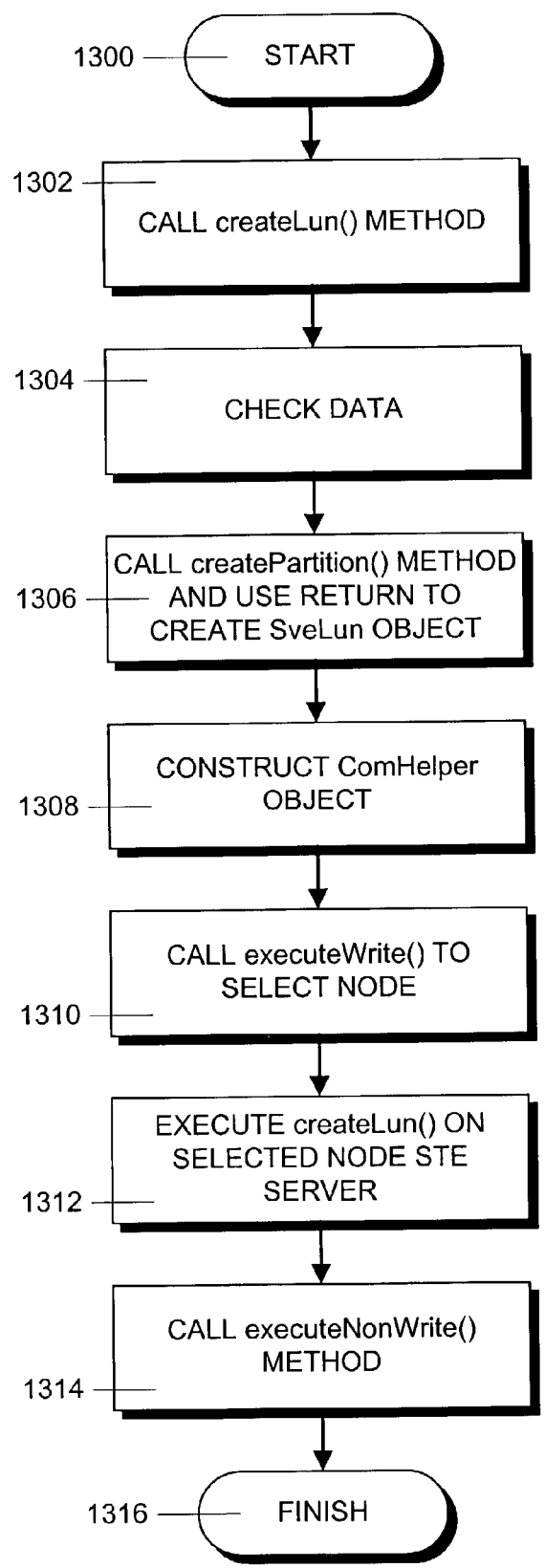
FIG. 13 is a flowchart that shows the steps in an illustrative process for creating a new LUN.

FIG. 13 is an illustrative flowchart illustrating the steps in creating a LUN. The simplest possible way to create a LUN is by calling the createLun( ) Method:

```
public void createLun(int lunNumber, String poolName,
               long size, int svePath)
       throws SveIncompleteOpException, SveFailedOpException;
```

This call will result in the creation of a LUN that has default properties and is not masked to any initiators. The steps that occur during execution of the createLun( ) method begin with step 1300. The process then proceeds to step 1302 where a client calls the createLun( ). In step 1304, a number of checks are made against the data collected by the control components during startup before any call goes to a server. For the call to be executed correctly the LUN must not already exist, the named pool must exist and contain sufficient available space to satisfy the request and the specified path must be valid.

If these conditions are met, then, in step 1306, the SveLunControl object makes a call to the createPartition( ) method of the SvePoolControl object and specifies the pool name and size. The createPartition( ) method uses an AllNodesComHelper object to select a node and call its SVM server to create the partition and write it into the persistent metadb database. The createPartitionInCore( ) method is then called to create the partition in the kernel memory of all of the remaining nodes. The soft partition must be created on all nodes within the system even if the resulting LUN will be exported only from a subset of the nodes.

In step 1308, the SveLunControl object constructs a ComHelper object with the svePath ID of the path on which the LUN will be exported. In this step, the SveLunControl object creates a MethodInfo object that describes the call to be made to the createLun( ) method of the STE server with the database update flag set to "true." In step 1310 the executeWrite( ) method of the ComHelper object is called passing in the MethodInfo object. The executeWrite method selects a node and, in step 1312, the executeWrite( ) method executes the createLun( ) method on the STE server for that node. An SteLunProperties object is returned to the SteLunControl object. This SteLunProperties object and the PartitionInfo object returned by the createPartition( ) method of the SvePoolControl object are used to construct an SveLun object that will be held in the SveLunControl object. Next, in step 1314, the database update flag of the MethodInfo object is set to false and the executeNonWrite( ) method of the ComHelper object is called. This results in an update of the kernel memory in all of the nodes of the system that are part of the path of this LUN other than the node to which the executeWrite( ) method wrote. The process then finishes in step 1316.

Figure 14:
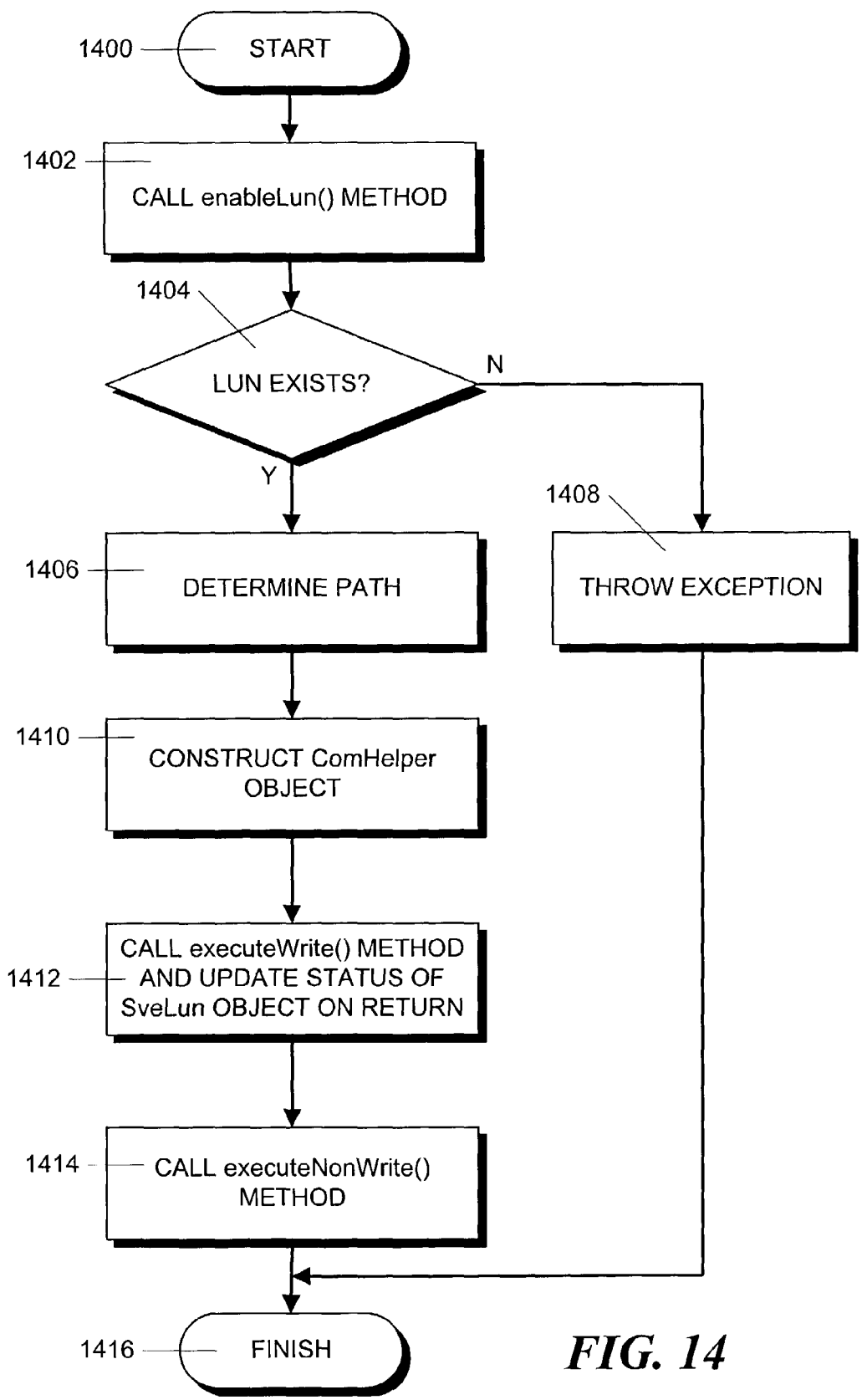
FIG. 14 is a flowchart that shows the steps in an illustrative process for enabling a disabled LUN.

A flowchart showing the steps in an illustrative process for enabling a LUN is shown in FIG. 14. This process begins in step 1400 and proceeds to step 1402 where a call is made to a method that starts the enable process. Such a method might be the following:

```
public void enableLun(int lunNumber)
     throws SveIncompleteOpException, SveFailedOpException;
```

When a client calls such an enableLun( ) method, the existence of the LUN is checked before calling any servers. If the LUN does not exist, as determined in step 1404, in step 1408, an exception is thrown and the process finishes in step 1416.

Alternatively, if the LUN exists, as determined in step 1404, the path on which it is exported is determined in step 1406 and a ComHelper object is constructed in step 1410 to manage the communication with the appropriate nodes. A MethodInfo object encapsulating the information about the enableLun( ) method of the STE client is constructed and passed to the executeWrite( ) method of the ComHelper object. The executeWrite method is then called in step 1412.

When the executeWrite( ) method returns successfully the status of the SveLun object located in the memory in the service processor is set to STATUS_ENABLED. In step 1414, the executeNonWrite( ) method of the ComHelpers object is then called to update the kernel data structures on the other nodes. The process then finishes in step 1416.

Figure 15:
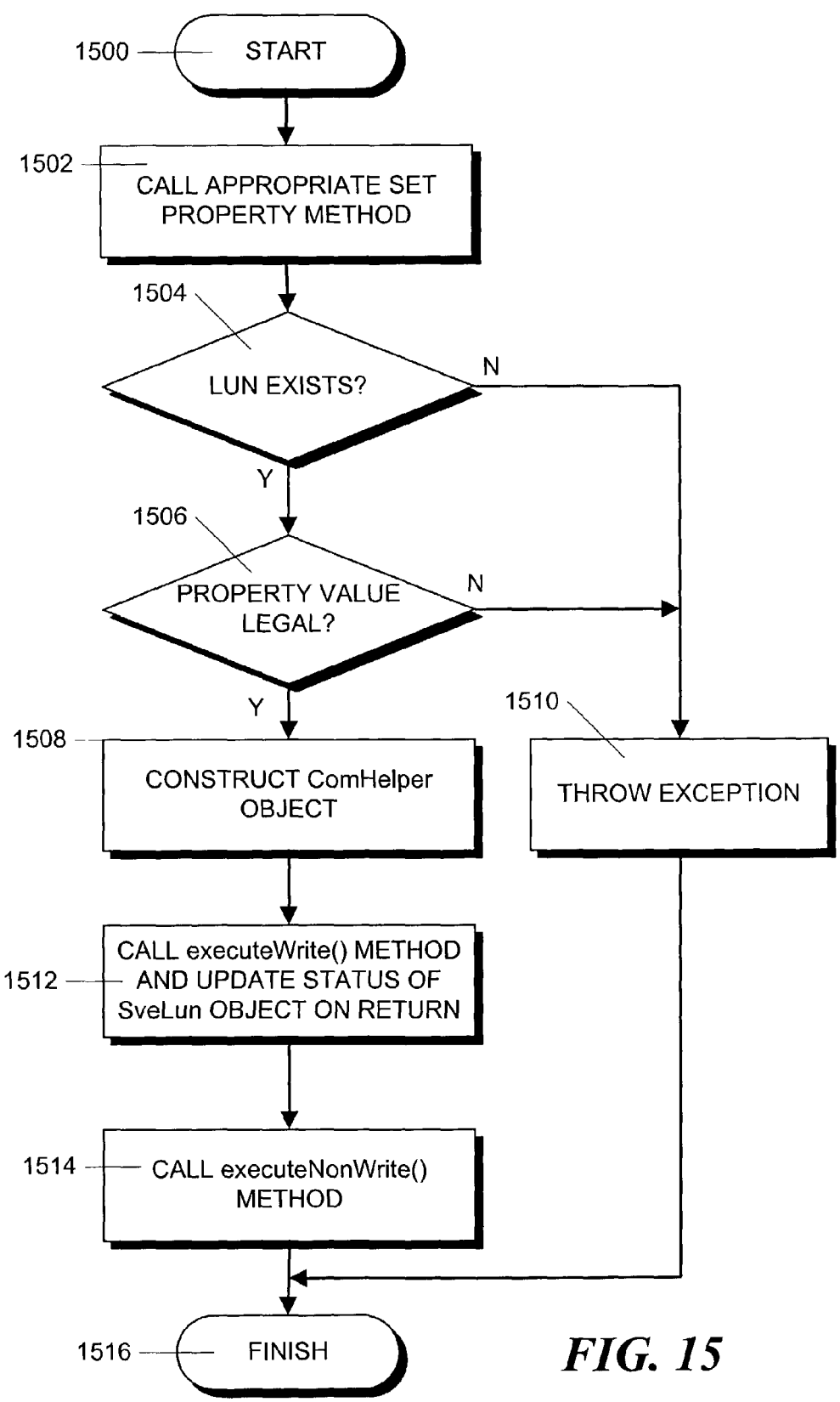
FIG. 15 is a flowchart that shows the steps in an illustrative process for setting properties of a LUN.

FIG. 15 is a flowchart showing the steps in an illustrative process for setting properties on the nodes. This process starts in step 1500 and proceeds to step 1502 where a set property command for the appropriate property is called. Property setting methods include a number of commands that set properties for existing LUNs. Specifically, these methods include the following:

```
public void enableReadAhead(int lunNumber)
   throws SveIncompleteOpException, SveFailedOpException;
public void disableReadAhead(int lunNumber)
   throws SveIncompleteOpException, SveFailedOpException;
public void changeActiveThreadCount(int lunNumber,
                         int threadCount)
   throws SveIncompleteOpException, SveFailedOpException;
public void changeQueueDepth(int lunNumber, int queueDepth)
   throws SveIncompleteOpException, SveFailedOpException;
public void changeFailoverMode(int lunNumber, int mode)
   throws SveIncompleteOpException, SveFailedOpException;
```

The process conforms closely to the process described above for enabling LUNs. Specifically, a check is made to determine whether the LUN exists. If the LUN does not exist as determined in step 1304, then, in step 1510, an exception is thrown and the process finishes in step 1516.

Alternatively, if the LUN exists, as determined in step 1304, then a further check is made to determine whether the new property value specified in the command is legal. If the value is not legal, as determined in step 1506, then in step 1510, an exception is thrown the process finishes in step 1516. However, if the new command value is legal as determined in step 1506, a ComHelper object is constructed for the LUNs path in step 1508. An appropriate MethodInfo object is constructed that identifies the server node method to be called and the parameters with which to call it in order to set the correct property. The executeWrite( ) method of the ComHelper object is called in step 1512, resulting in the property being changed in memory and in the database on a single node. The new property value is then set in the SveLun object in memory on the service processor when the executeWrite( ) method returns. In step 1514, the executeNonWrite method of the ComHelper object is called to set the property in memory on the remaining nodes on which the LUN exists.

Figure 16:
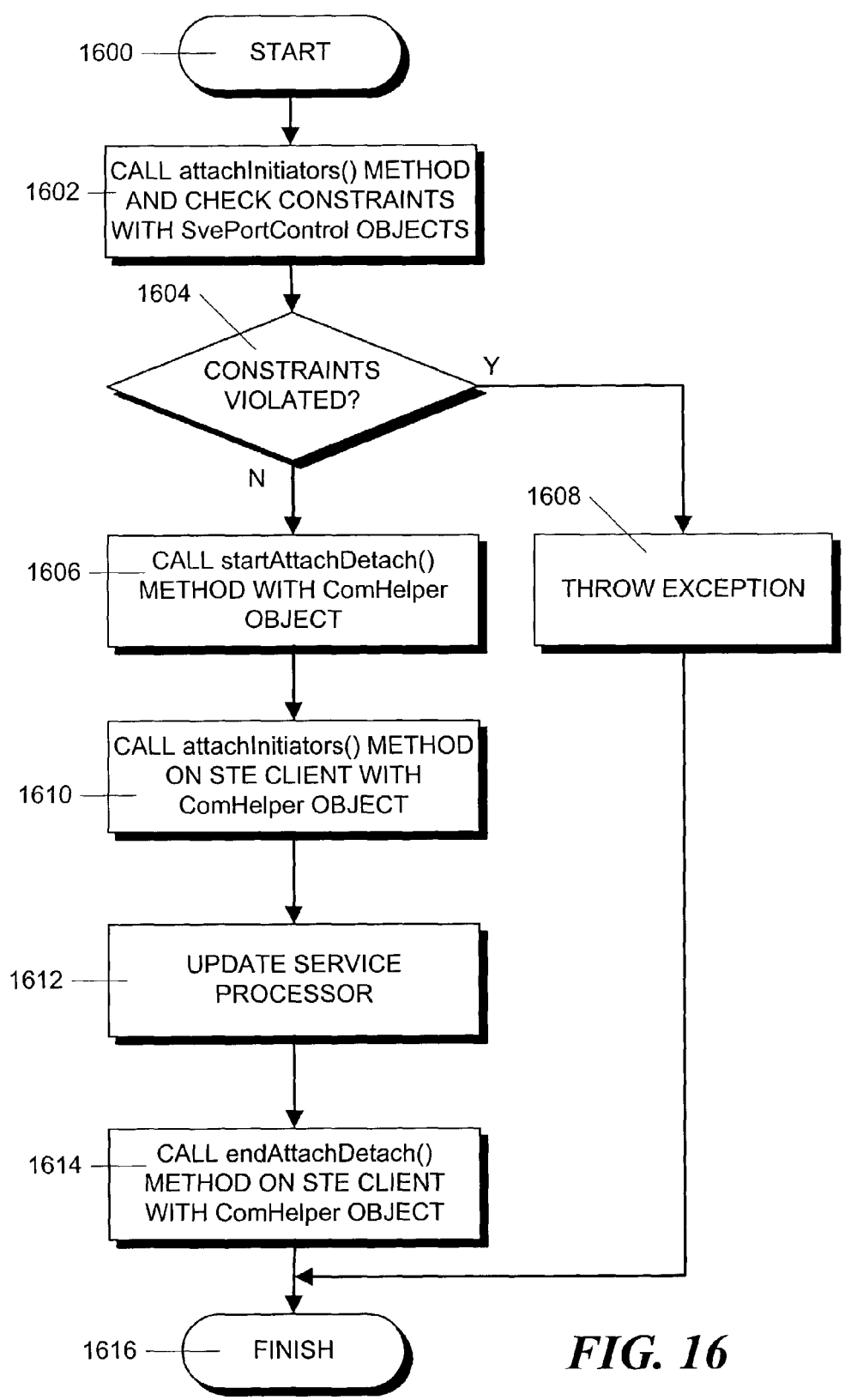
FIG. 16 is a flowchart that shows the steps in an illustrative process for masking and mapping operations.

FIG. 16 is a flowchart that shows the steps in an illustrative process for performing masking and mapping operations. Masking and mapping are different from property changes because there are more constraints that must be met and because these changes require a three-stage operation in order to complete the change.

This process begins in step 1600 and proceeds to step 1602 where an attach initiators method such as:

```
public void attachInitiators(int lunNumber,
                    SveLunInitiatorMap[ ] maps)
    throws SveIncompleteOpException, SveFailedOpException;
``` is called. A check is then made whether certain constraints are violated by the call. The following constraints are enforced by the SveLunControl object when the attachInitiators( ) method is called: (1) the combination of the initiator wwn, the target port wwns and the SCSI ID for the resulting LUN must be unique across the system and (2) if any initiator determines that two LUNs exist on a target port with different SCSI IDs, then the LUNs cannot refer to the same backend storage. In order to enforce these constraints, the SveLunControl object works with the SvePortControl object that maintains SvePort objects that track the objects to which the SCSI ID initiators have been masked. Before beginning to perform an attachInitiators( ) method, the SveLunControl object verifies that the initiators being attached will not lead to a violation of the above constraints. Specifically, this determination is made in step 1604. If the constraints are violated, then in step 1608, an exception is thrown and the process finishes in step 1616.

After the new attach method has been checked, in step 1606, the SveLunControl object uses a ComHelper object constructed with the LUN path to call the startAttachDetach( ) method on the STE client on each of the nodes that export the target LUN. Once that method has successfully returned, in step 1610, the SveLunControl object calls the attachInitiators( ) method on each STE client again using a ComHelper object with the appropriate path in order to perform the actual attachment operation.

In step 1612, the service processor state is updated. This includes updating the affected ports so that the SCSI ID of the LUN is marked as in use for each initiator that has been attached and updating the mask of the LUN to include the initiators. Finally, in step 1614, the endAttachDetach( ) method of each STE client is called on each affected node using another ComHelper object. The process then finishes in step 1616.

Figure 17:
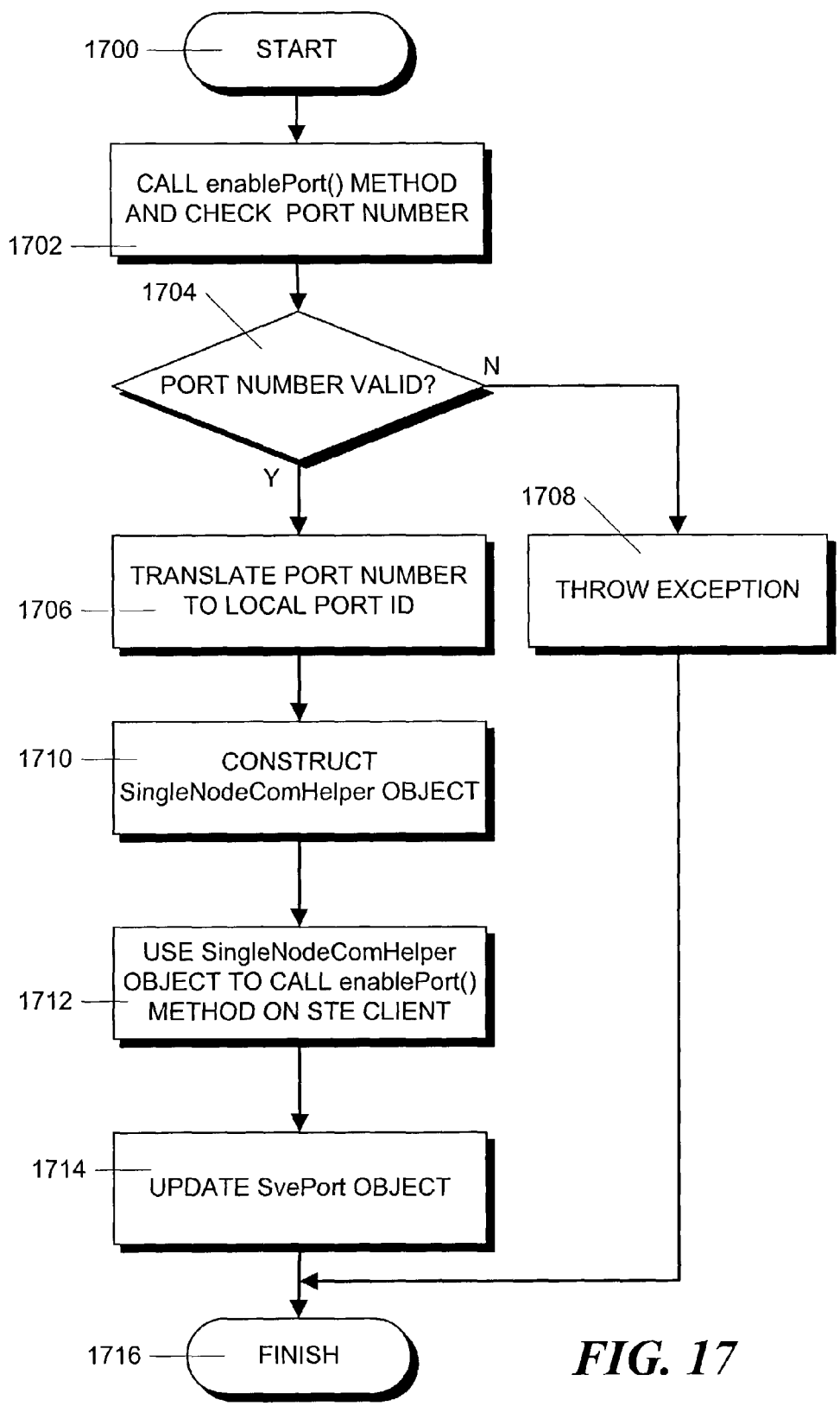
FIG. 17 is a flowchart that shows the steps in an illustrative process for enabling a port.

A client of the API can enable a disabled port by calling an enable port method. This process is outlined in the flowchart shown in FIG. 17. The process begins in step 1700 and proceeds to step 1702 where an enable port method such as:

```
public void enablePort(int portNo)
    throws SveFailedOpException;
``` is called with a portNo value passed in. First, a check is made to determine whether the port number passed in is valid. If the number is not valid as determined in step 1704, then the process proceeds to step 1708 where an exception is thrown and the process ends in step 1716. Alternatively, if it is determined in step 1704, that the portNo value passed in represents a valid port number, in step 1706, the SvePortControl object determines the node on which that port is located and translates the incoming portNo to a local port ID for that node.

In step 1710, the SvePortControl object constructs a SingleNodeComHelper object. Using the SingleNodeComHelper object, in step 1712, the SvePortControl object calls the enablePort( ) method on the STE client for the appropriate node. The result of this call is that all LUNs exported from that port that are enabled will now be exported through the port. After the call to the client, in step 1714, the SvePort object that describes the port is update to reflect that it is now enabled. The process then finishes in step 1716.

Figure 18:
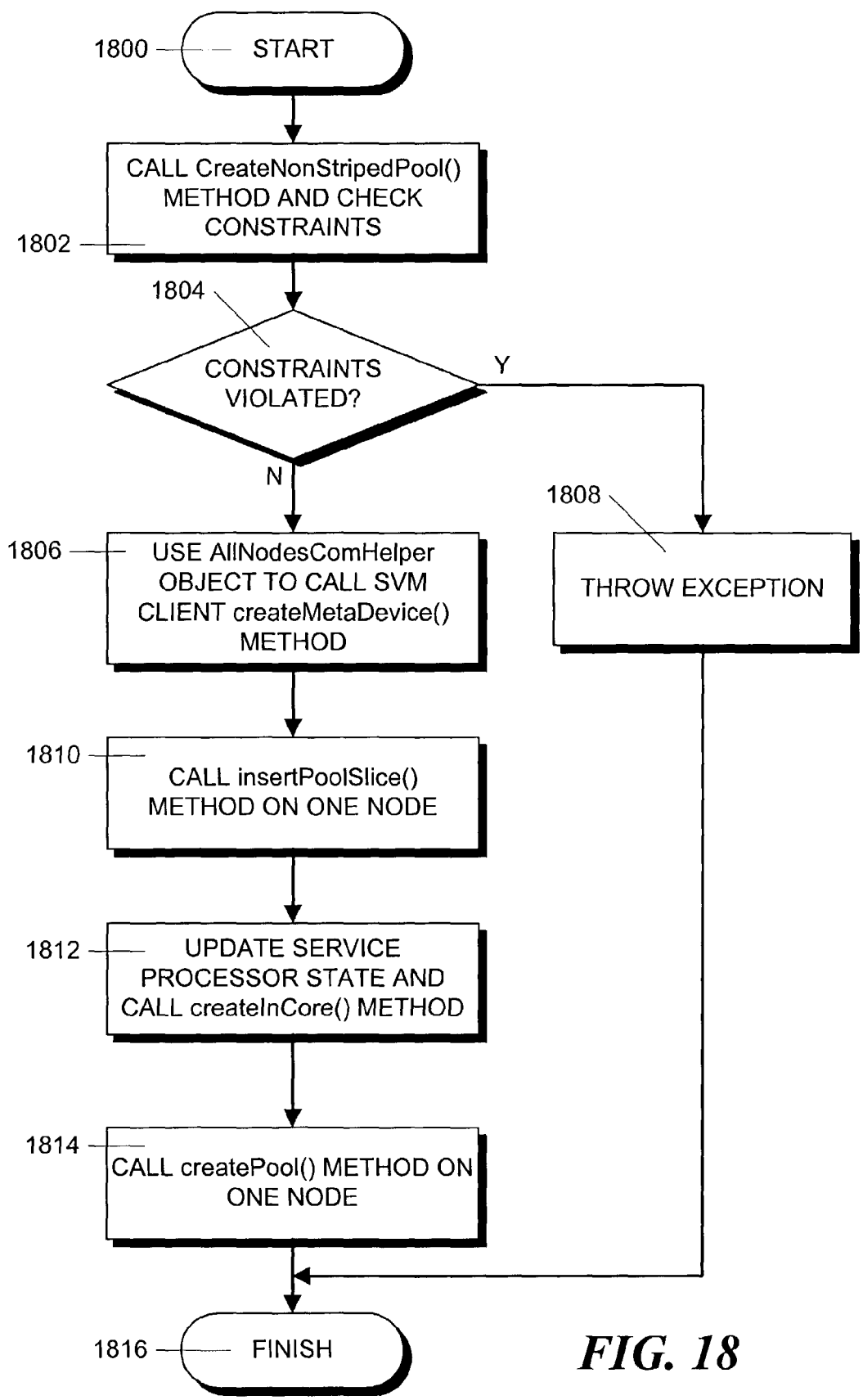
FIG. 18 is a flowchart that shows the steps in an illustrative process for creating a new non-striped pool.

A client of the API can create a pool by calling the createNonStripedPool( ) method of SvePoolControl object. This process is shown in the flowchart of FIG. 18 that illustrates the steps in an illustrative process for creating a new pool. This process begins in step 1800 and proceeds to step 1802 where a create pool method such as the following:

```
public void createNonStripedPool(String poolName,
                    String poolSliceName)
    throws SveIncompleteOpException, SveFailedOpException;
``` is called. The createNonStripedPool( ) method will throw an exception as set forth in step 1808, if, as determined in step 1804, certain constraints are violated. These constraints are violated if the pool name is already in use, or if the pool slice identified does not exist or if the pool slice is already part of an existing pool device.

If none of these problems exist, in step 1806, the SvePoolControl object selects a free metadevice ID and, in step 1806, uses an AllNodesComHelper) object to call the createMetadevice( ) method on the SVM client on a write node. The SvePoolControl object, in step 1810, calls the insertPoolSlice( ) method of the Pool client on one node. This will record in the dscfg database that the slice has been used to create a pool device.

Then, in step 1812, the SvePoolControl object updates the service processor state to include a new SvePool object that includes the new SvePoolDevice and calls the createInCore( ) method on the SVM client to create the metadevice on the other nodes. This pool device must now be persistently registered as being a part of the new pool. To accomplish this, the createPool( ) method of the SVM client is called on any single node. This results in the pool to pool device association being written into the dscfg database. The process then finishes in step 1816.

Figure 19:
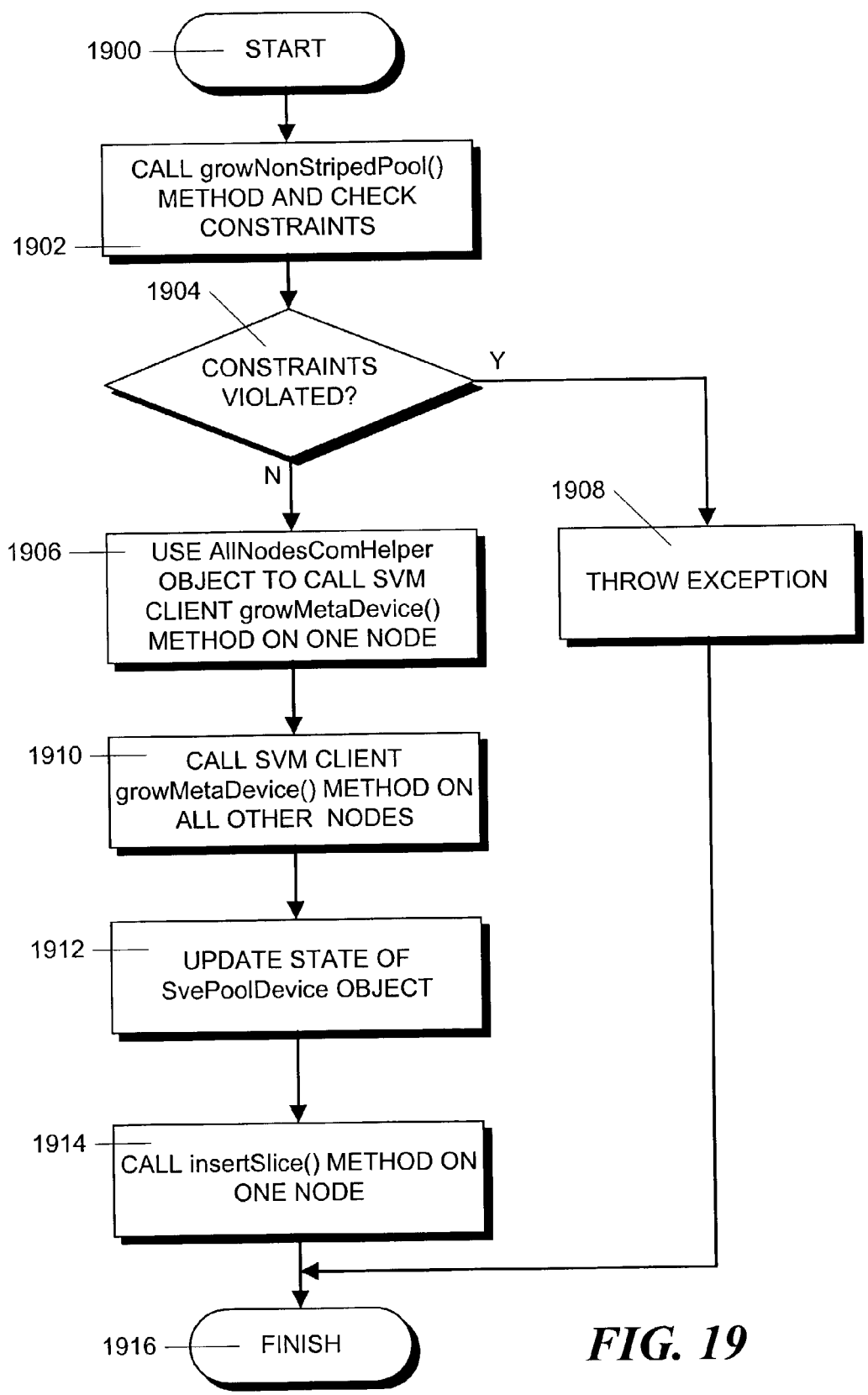
FIG. 19 is a flowchart that shows the steps in an illustrative process for growing a non-striped pool.

FIG. 19 shows steps in an illustrative process for growing a non-striped pool. This process begins in step 1900 and proceeds to step 1902 where an appropriate grow method is called. Existing pool devices can be grown by calling either the growStripedPoolDevice( ) method or the growNonStripedPoolDevice( ) method of the SvePoolControl object:

```
public void growNonStripedPoolDevice(String poolDeviceName,
                    String poolName,
                    String poolSliceName)
    throws SveIncompleteOpException, SveFailedOpException;
```

The growNonStripedPoolDevice( ) method will throw an exception in step 1908 if certain constraints are not met, as determined in step 1904. Specifically, an exception will be thrown if the pool, the pool device or the pool slice do not exist. An exception will also be thrown if the pool slice is already in use in a pool device.

If all of the arguments are valid, in step 1906, the growMetadevice( ) method of the SVM client on one node will be called using an AllNodesComHelper object causing write to the metadb database. in step 1910, the growMetadevice( ) method is then called in parallel on the remaining nodes to update the in memory state of the other nodes.

In step 1912, the SvePoolDevice object that is held on the service processor is updated to reflect the new size and characteristics of the device and, in step 1914, a call is made the insertPoolSlice( ) method of the pool client on one node to record in the dscfg database that the slice has been used in a pool device. The process then finishes in step 1916.

Figure 20:
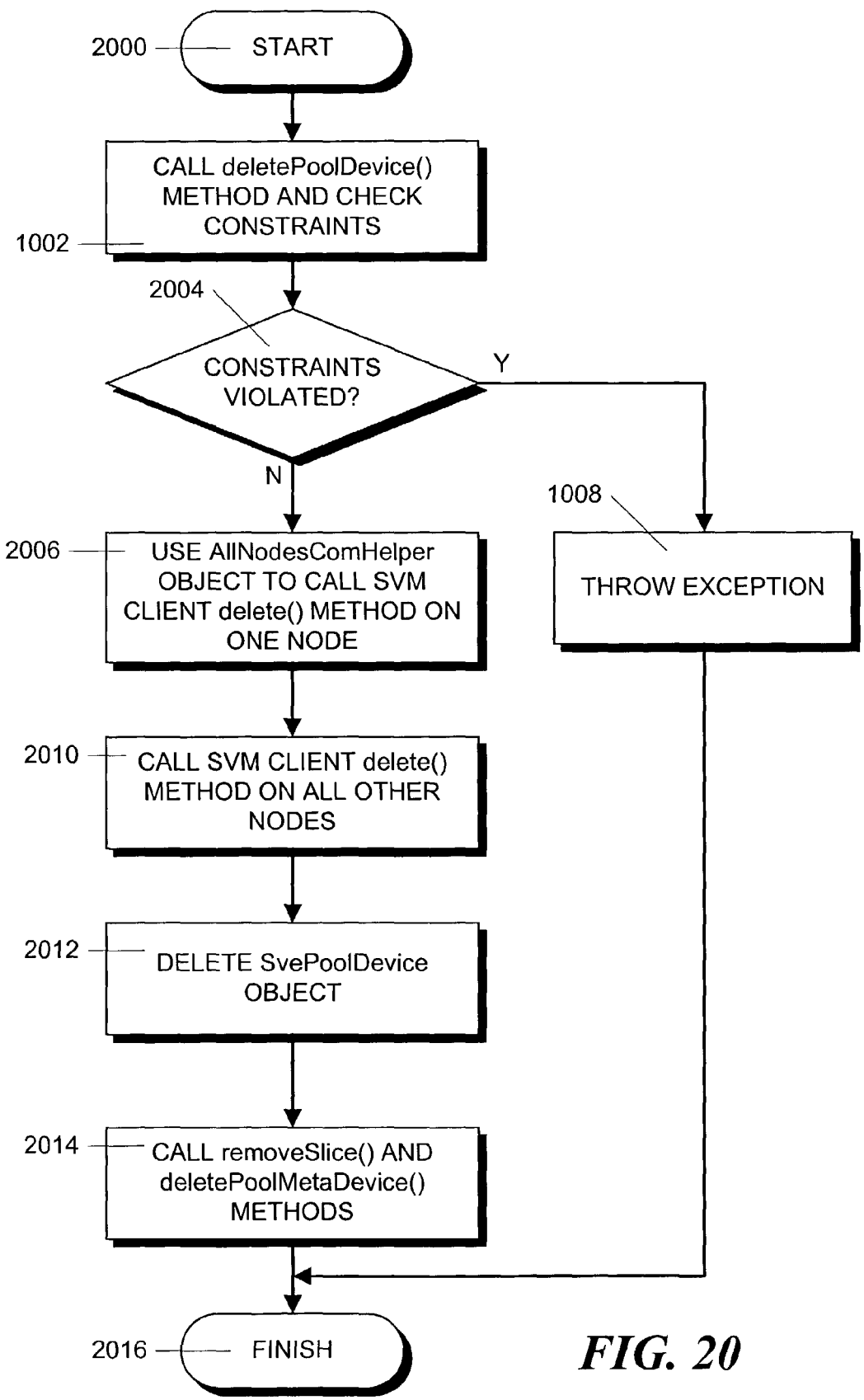
FIG. 20 is a flowchart that shows the steps in an illustrative process for deleting a pool device.

A flowchart that shows the steps in an illustrative process for deleting a pool device is shown in FIG. 20. This process begins in step 2000 and proceeds to step 2002 where a deletePoolDevice( ) method of the SvePoolControl object is called. First, in step 2004, a check is made to determine whether required constraints are violated. Deletion of a pool device requires that the device exists and that no soft partitions have been carved from the device. If these conditions are not met an exception is thrown in step 2008 and the process finishes in step 2016.

Alternatively, if, as determined in step 2004, the constraints are met, in step 2006, the delete( ) method of an SVM client is invoked using AllNodesComHelper object to write to the database on one node. In step 2010, the delete( ) method of the SVM client on all of the other nodes is called to do kernel-only updates. After the successful deletion of the pool device, in step 2012, the corresponding SvePoolDevice object is deleted from the service processor state.

In step 2014, the SvePoolControl object now calls the removePoolSlice( ) method of the pool client to free the slices for further use and then calls the deletePoolMetadevice( ) method of the pool client to remove the pool device from the pool in the dscfg database. The process then ends in step 2016.

The SveNodeControl object provides access to the functionality of the Node clients for each node. The methods are the same as those of the Node client except that the methods of the SveNodeControl object in each case receive an integer that determines the node on which to execute the command. The only exception to this is setRnid method. The SveNodeControl object provides the ability to reboot a node. The caller must specify the node ID of the node to be rebooted and set a flag to true if the reboot should take the node to single user mode. Such a method is as follows:

```
public void rebootNode(int nodeNumber,
                       boolean singleUserMode)
    throws SveFailedOpException;
```

If the node number represents a valid node, a call is made to the rebootNode( ) method of the Node client for that node resulting in the reboot of the node.

The SveIIControl object controls the II data imaging service on SVE nodes. It enforces the II data service rules mentioned above the SveIIControl object methods are very similar to the methods of the II client, except that the SveIIControl object manages the concept of LUNs which represented by integers and the II client object interacts with volumes which are represented by strings. The mapping between LUNs and volumes is determined by the SveIIControl object.

For example, in order to attach an overflow volume to a volume set, an API client will call the method:

```
public void attachOverflowToSet(int overflowLunNumber,
                                int shadowLunNumber)
    throws SveFailedOpException;
```

The method checks if the set already exists (represented by the shadow), then it will make sure that the rule "an overflow can be attached to an II set only if the II set is a dependent II set AND the shadow LUN size is less than the master LUN size" is not violated. Next, the method calls the corresponding method in the II client object, which, in turn, calls the appropriate method of the II Server object. The attach operation will fail if any preconditions fails, and the SveFailedOpException will be thrown.

Figure 21:
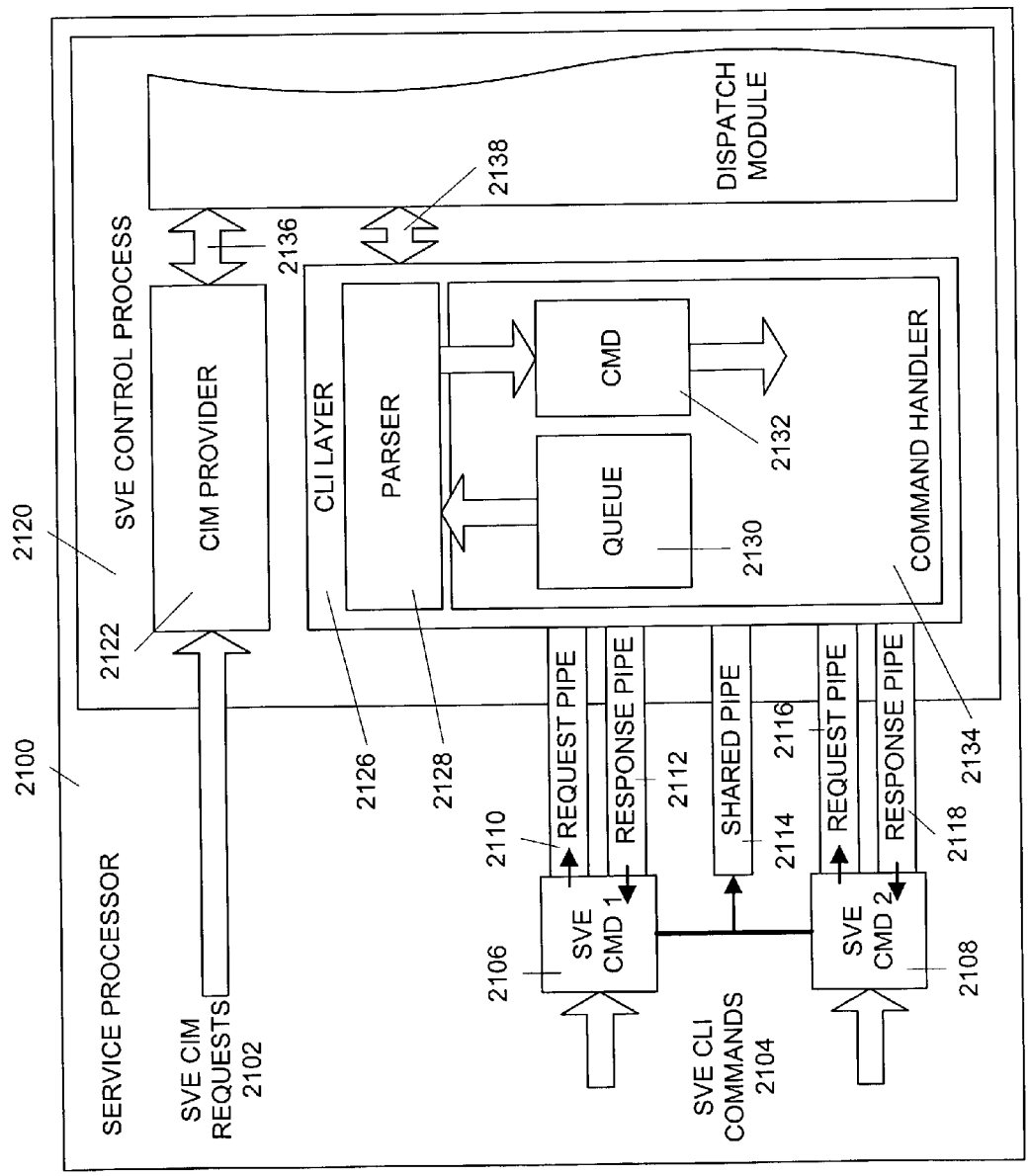
FIG. 21 is a block schematic diagram showing how the SVE control process can be controlled by a CLI interface and a CIM provider, both of which interface with the control process API.

The SVE API can be used to build various applications. An SVE CLI is an example of application that can be built on top of the SVE API. A schematic block diagram of such an application is illustrated in FIG. 21. The SVE CLI commands 2104 are UNIX shell scripts that offer the same functionality as the API. Some examples of SVE CLIs are "dscreate lun10 dpath pathB pool myPool size 10g", "dslun enable lun15", "dspool create newPool diskSlice15", "dsport enable port1", "dsadm stop node3" etc. Since the SVE API is Java-based and there is a certain overhead associated with starting a JVM (Java Virtual Machine), starting a new JVM process every time a command is typed is not an efficient approach. Accordingly, one solution is to always run the API JVM as a daemon in the SVE control process 2120 in the service processor 2100 and to use some communication mechanism for passing data between the SVE command (the script) and the SVE daemon (sved). One simple communication mechanism is through Unix (named) pipes. Another possible way is using socket communication, but this requires extra care in blocking/limiting remote access (for security reasons) to sved. FIG. 21 shows two SVE commands 2106 and 2108. Command 2106, uses Unix request and response pipes 2110 and 2112, respectively. Command 2108 uses Unix request and response pipes 2116 and 2118, respectively. In addition, both commands also used a shared pipe 2114.

A CLI software layer 2126 is implemented in the sved on top of the existing API, in order to support the SVE CLI. There are two main components of this layer: the command handler 2134 and the parser 2128. The command handler 2134 is the component that receives the command data from an external process, such as process 2106, by reading from a pipe-type file from request pipe 2110. The command handler queues the request in queue 2130. The command handler 2134 then sends the request to the parser 2128 and receives the resulting command 2132 from parser 2128. The command handler then initiates command execution, unwraps the result and sends the result back to the caller 2106, via the response pipe 2112. The command handler also acts as the entry point in the sved. It includes the main class that reads the host names from a file and initializes the SveConfig object and the SveControl object.

The CLI parser 2128 is a JavaCC based program that checks if the command received is lexically and syntactically valid and builds a Command object 2132 as it performs the parsing. The command object 2132 is a Java interface that declares an execute( ) method that is called by the command handler 2134 after parsing is complete. The command object has the form"

```
public abstract class Command {
    protected CommandResult result = null;
    ...
    public abstract CommandResult execute( );
}
```

It is the implementation of the execute( ) method in each descendent of the command object 2132 that contains the SVE API calls. Each of the following classes has its own execute( ) method implementation: CreateCmd, LunCmd, PoolCmd, InfoCmd, AdmCmd, PortCmd and IIAdmCmd. For each new CLI command, the parser 2128 creates an instance of one the classes above and then, as it processes the command string, it initializes members of the newly created object to reflect various options specified by the user. If some error occurs during parsing, the result field will be set appropriately.

When the command handler 2134 receives a command object 2132 back from the parser 2128, the command handler 2134 calls the execute( ) method which returns a CommandResult object that has the following form:

```
public class CommandResult {
    protected String msg; // the message to be displayed
    protected int retCode; // the return code
    ...
}
```

At this point, the command handler 2134 only needs to extract the two pieces of information from the object and then send them to the CLI script 2106 using the shared pipe 2114, which will display the message and return the corresponding exit code.

Another example of an application that can be built on the SVE API is a CIM provider. The Common Information Model (CIM) is a common data model of an implementation-neutral schema for describing overall management information in a network/enterprise environment. CIM is comprised of a Specification and a Schema. The Specification defines the details for integration with other management models (i.e. SNMP's MIBs or the DMTF's MIFs) while the Schema provides the actual model descriptions. Vendors often follow the CIM model for the software and hardware they sell. The benefit of following the standard is that the product operates well in a heterogeneous environment as it can be managed by any CIM management utility. Increasingly, all the hardware vendors, especially storage hardware vendors, are following the standard as the customers value the CIM-compliantness of the product—it is a "checkbox" item for the storage product they buy today.

An SVE CIM provider 2122 populates the appropriate CIM models for the storage virtualization engine as specified by the DMTF/SNIA (standards organizations controlling CIM model development). The CIM objects are populated with the help of SVE Control software. This SVE Control software provides APIs to the CIM Provider to create/modify/delete SVE objects corresponding to CIM objects. APIs are also provided to control SVE objects for the corresponding CIM objects. The CIM client connects to the CIMOM, retrieves the handle to the SVE CIM provider 2122, and executes various SVE CIM requests 2102 that the SVE CIM provider 2122 exposes. These method calls, in turn, result in API calls to the control software, and the SveControl object ensures correct execution of the appropriate actions to the four SVE nodes as shown in FIG. 2.

The most important aspect of this design is that the SVE Control software runs in the same Java Virtual Machine (JVM) as the SVE CIM Provider 2122, which, in turn, runs within the context of the JVM running the CIMOM. By virtue of this design, no separate JVM is required for SVE Control software thereby saving significant system resources and enhancing performance of the SVE management software.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, SVE control operations different from those shown may be performed. Other aspects, such as the specific process flow and the order of the illustrated steps, as well as other modifications to the inventive concept are intended to be covered by the appended claims.

What is claimed is:

1. Apparatus for managing, from a computer at a central location, a storage virtualization engine consisting of a plurality of existing volume manager programs, each volume manager program running on a host server having a local memory in one of a plurality of networked nodes and managing storage connected to the host server by an existing switch fabric, the apparatus comprising:

means operating in the computer at the central location that sends a command to one of the plurality of nodes to cause a volume manager located at that node to perform a desired operation on storage located at that node via the existing switch fabric; and means operating in the computer at the central location that is responsive to the command for sending additional commands to existing volume manager programs running on host servers in nodes other than the one node in order to synchronize information in the local memory of each host server so that the storage located at all of the nodes appears to be a single virtual storage pool.

2. The apparatus of claim 1 further comprising, for each node, a node client in the central location and a node server located at the each node and wherein the node client communicates commands from the management software to each of the node servers.

3. The apparatus of claim 2 further comprising a dispatch mechanism in the central location that is responsive to the command for controlling a node client corresponding to the one of the plurality of nodes for sending the command to the node server located in the one of the plurality of nodes.

4. The apparatus of claim 3 wherein the dispatch mechanism is responsive to the command for controlling each node client corresponding to nodes other than the one node for sending additional commands to node servers located in nodes other than the one node to synchronize memories in volume managers located in nodes other than the one node.

5. The apparatus of claim 1 further comprising for each node, an event client in the central location and an event server located at the each node and wherein the node server in a node notifies the event client corresponding to that node when selected events occur in that node.

6. The apparatus of claim 1 wherein at least one of the plurality of nodes has a data service manager running therein and wherein the apparatus further comprises data service management software at the central location that sends a command to the at least one of the plurality of nodes to cause the data service manager running located at that node to provide a data service.

7. A computer-implemented method for managing, from a computer at a central location, a storage virtualization engine consisting of a plurality of existing volume manager programs, each volume manager running on a host server having a local memory in one of a plurality of networked nodes and managing storage connected to the host server by an existing switch fabric, the method comprising:

(a) sending a command from the computer at the central location to one of the plurality of nodes to cause a volume manager program located at that node to perform a desired operation on storage located at that node via the existing switch fabric; and (b) in response to the command, sending additional commands from the computer at the central location to existing volume manager programs running on host servers in nodes other than the one node in order to synchronize information in the local memory of each host server so that the storage located at all of the nodes appears to be a single virtual storage pool.

8. The method of claim 7 further comprising:

(c) creating a node client in the central location for each node;

(d) creating a node server located at the each node; and (e) using the node client to communicate commands from the management software to each of the node servers.

9. The method of claim 8 further comprising:

(f) controlling a node client corresponding to the one of the plurality of nodes in response to the command to send the command to the node server located in the one of the plurality of nodes.

10. The method of claim 9 further comprising:

(g) controlling each node client corresponding to nodes other than the one node in response to the command to send additional commands to node servers located in nodes other than the one node to synchronize memories in volume managers located in nodes other than the one node.

11. The method of claim 7 further comprising:

(h) creating for each node, an event client in the central location;

(i) creating an event server located at the each node; and (j) using the node server in a node to notify the event client corresponding to that node when selected events occur in that node.

12. The method of claim 7 further comprising:

(k) running a data service manager in at least one of the plurality of nodes; and (l) sends a command from the central location to the at least one of the plurality of nodes to cause the data service manager running located at that node to provide a data service.

13. Apparatus for management of a storage virtualization engine consisting of a plurality of existing volume manager programs, each volume manager program running on a host server having memory in one of a plurality of networked nodes and managing storage connected to the host server by an existing switch fabric, from a computer at a central location, the apparatus comprising:

management software operating in the computer at the central location that provides an application programming interface containing a plurality of API commands for controlling the storage virtualization engine and data services;

a dispatch module that is controlled by the management software to translate the commands into appropriate instructions for one of the volume manager programs running on a host server in one of the plurality of nodes; and a communication mechanism controlled by the dispatch module that sends selected commands to volume manager programs in all nodes in order to maintain synchronization of information in the memory of each node so that the volume manager programs act together as a storage virtualization engine.

14. The apparatus of claim 13 wherein the communication mechanism comprises, for each node, a node client in the central location and a node server located at the each node.

15. The apparatus of claim 14 wherein the node server translates instructions received from the node client into local commands that are compatible with the volume manager running on the each node.

16. The apparatus of claim 14 wherein a plurality of data services are provided at each node and wherein each node client comprises a plurality of service clients, one of the plurality of service clients generating instructions that control the volume manager.

17. The apparatus of claim 16 wherein one of the plurality of service clients generates instructions that control one of the plurality of data services.

18. The apparatus of claim 16 wherein the node server comprises a plurality of service servers, each of the service servers receiving instruction generated by one of the service clients.

19. The apparatus of claim 18 wherein one of the service servers controls the volume manager on the each node.

20. The apparatus of claim 19 wherein one of the plurality of service clients receives instructions that control one of the plurality of data services.

21. The apparatus of claim 13 further comprising a database connected to the networked nodes for storing a view of the physical storage and wherein the communication mechanism sends selected commands to one of the plurality of nodes so that the view of the physical storage is stored in the memory of the one node and in the database.

22. The apparatus of claim 21 wherein the communication mechanism further comprises a mechanism for updating the memory of nodes other than the one node without updating the database.

23. The apparatus of claim 13 further comprising a state information storage at the central location and a mechanism for updating the state information storage when any changes are made in a memory of any of the plurality of nodes.

24. The apparatus of claim 23 wherein the communication mechanism comprises a mechanism for receiving state information from each of the nodes and an update mechanism that is responsive to received state information for updating the state information storage at the central location.

25. A computer-implemented method for management of a storage virtualization engine consisting of a plurality of existing volume manager programs, each volume manager program running on a host server having memory in one of a plurality of networked nodes and managing storage connected to the host server by an existing switch fabric, from a computer at a central location, the method comprising:
 (a) providing with management software operating in the computer at the central location an application programming interface containing a plurality of API commands for controlling the storage virtualization engine and data services;
 (b) using a dispatch module operating under control of the management software, to translate the commands into appropriate instructions for one of the volume manager programs running on a host server in one of the plurality of nodes; and
 (c) sending under control of the dispatch module selected commands to volume manager programs in all nodes in order to maintain synchronization of information in the memory of each node so that the volume manager programs act together as a storage virtualization engine.

26. The method of claim 25 wherein step (c) comprises:
 (c1) for each node, creating a node client in the central location; and
 (c2) creating a node server located at the each node.

27. The method of claim 26 wherein step (c) further comprises:
 (c3) using the node server to translate instructions received from the node client into local commands that are compatible with the volume manager running on the each node.

28. The method of claim 26 further comprising:
 (d) providing a plurality of data services at each node; and
 (e) creating a plurality of service clients in each node client, one of the plurality of service clients generating instructions that control the volume manager.

29. The method of claim 28 further comprising:
 (f) using one of the plurality of service clients to generate instructions that control one of the plurality of data services.

30. The method of claim 28 further comprising:
 (f) creating a plurality of service servers in each node server, each of the service servers receiving instruction generated by one of the service clients.

31. The method of claim 30 wherein step (f) comprises:
 (f1) controlling the volume manager on the each node with one of the service servers.

32. The method of claim 31 wherein step (f) further comprises:
 (f2) using one of the plurality of service clients to receive instructions that control one of the plurality of data services.

33. The method of claim 25 wherein the storage virtualization engine further comprises a database connected to the networked nodes for storing a view of the physical storage and wherein step (c) comprises:
 (c1) sending selected commands to one of the plurality of nodes so that the view of the physical storage is stored in the memory of the one node and in the database.

34. The method of claim 33 wherein step (c) further comprises:
 (c2) updating the memory of nodes other than the one node without updating the database.

35. The method of claim 25 wherein the storage virtualization engine further comprises a state information storage at the central location and the method further comprises:
 (d) updating the state information storage when any changes are made in a memory of any of the plurality of nodes.

36. The method of claim 35 wherein step (c) comprises:
 (c1) receiving state information from each of the nodes; and
 (c2) updating the state information storage at the central location in response to received state information.

37. A computer program product for management of a storage virtualization engine consisting of a plurality of existing volume manager programs, each volume manager program running on a host server having memory in one of a plurality of networked nodes and managing storage connected to the host server by an existing switch fabric, from a central location, the computer program product comprising a tangible computer usable medium having computer readable program code thereon, including:
 program code for creating, in the central location, management software that has an application programming interface containing a plurality of API commands for controlling the storage virtualization engine and data services;
 program code for creating a dispatch module in the central location operating under control of the management software, that translates the commands into appropriate instructions for one of the volume manager programs running on one of the plurality of nodes; and
 communication program code operating under control of the dispatch module that sends selected commands to volume manager programs in all nodes in order to maintain synchronization of information in the memory of each node so that the volume manager programs act together as a storage virtualization engine.

* * * * *